US007893813B2

(12) United States Patent
Nikitin et al.

(10) Patent No.: US 7,893,813 B2
(45) Date of Patent: Feb. 22, 2011

(54) AUTOMATIC DATA COLLECTION DEVICE, METHOD AND ARTICLE

(75) Inventors: Pavel Nikitin, Seattle, WA (US);
Venkata Kodukula, Bothell, WA (US);
For Sander Lam, Bothell, WA (US);
Andrew Reynolds, Bothell, WA (US);
Rene Martinez, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 1549 days.

(21) Appl. No.: 11/191,616

(22) Filed: Jul. 28, 2005

(65) Prior Publication Data
US 2007/0024423 A1    Feb. 1, 2007

(51) Int. Cl.
*H04Q 5/22*    (2006.01)
*G08B 13/14*    (2006.01)

(52) U.S. Cl. .................. 340/10.1; 340/10.4; 340/572.7; 235/491; 235/449

(58) Field of Classification Search ................ 340/10.1, 340/10.4, 539.22, 572.7, 825.54; 343/700, 343/772, 895; 455/90.3, 73; 235/491, 449
See application file for complete search history.

(56) References Cited

U.S. PATENT DOCUMENTS

| 836,531 | A | 11/1906 | Pickard |  |
|---|---|---|---|---|
| 837,616 | A | 12/1906 | Dunwoody |  |
| 3,710,337 | A | 1/1973 | Grant | 343/701 |
| 3,852,755 | A | 12/1974 | Works et al. | 343/701 |
| 3,949,403 | A | 4/1976 | Yoshida et al. | 343/225 |
| 4,080,603 | A | 3/1978 | Moody | 343/712 |
| 4,344,184 | A | 8/1982 | Edwards | 455/95 |
| 4,562,102 | A | 12/1985 | Rabuse et al. | 428/43 |
| 4,742,567 | A | 5/1988 | Ohe et al. | 455/277 |
| 4,816,839 | A | 3/1989 | Landt | 343/795 |

(Continued)

FOREIGN PATENT DOCUMENTS

EP    0 595 549 A2    5/1994

(Continued)

OTHER PUBLICATIONS

Straw, R., et al., *The ARRL Handbook—For Radio Amateurs*, 76th ed., The American Radio Relay League, Newington, CT, 1999, chapter 20, "Antennas & Projects," pp. 20.31-20.37.

(Continued)

*Primary Examiner*—Brian A Zimmerman
*Assistant Examiner*—Nam V Nguyen
(74) *Attorney, Agent, or Firm*—Seed IP Law Group PLLC

(57) ABSTRACT

A radio frequency identification system comprises a radio-frequency identification substrate and an interrogator. In one embodiment, the radio-frequency identification substrate comprises a plurality of radio-frequency identification devices. In one embodiment, a controller on the substrate controls a first one of the plurality of radio-frequency identification devices based on a state of a second one of the plurality of radio-frequency identification devices. In one embodiment, an antenna system includes an S-shaped portion electrically coupled to an integrated circuit along a central portion of the S-shaped portion. Adjusting the parameters of the segments making up the S-shaped portion controls performance characteristics of a radio-frequency identification device.

51 Claims, 22 Drawing Sheets

U.S. PATENT DOCUMENTS

| | | | | |
|---|---|---|---|---|
| 4,853,705 | A | 8/1989 | Landt | 343/803 |
| 4,915,519 | A | 4/1990 | Afzali-Ardakani et al. | 400/120 |
| 5,047,860 | A | 9/1991 | Rogalski | 358/198 |
| 5,075,691 | A | 12/1991 | Garay et al. | 343/830 |
| 5,095,382 | A | 3/1992 | Abe | 359/489 |
| 5,097,484 | A | 3/1992 | Akaiwa | 375/40 |
| 5,142,292 | A | 8/1992 | Chang | 343/742 |
| 5,220,335 | A | 6/1993 | Huang | 343/700 |
| 5,267,800 | A | 12/1993 | Petteruti et al. | 400/88 |
| 5,382,784 | A | 1/1995 | Eberhardt | 235/472 |
| 5,430,441 | A | 7/1995 | Bickley et al. | 340/825.54 |
| 5,448,110 | A | 9/1995 | Tuttle et al. | 257/723 |
| 5,466,501 | A | 11/1995 | Logan et al. | 428/40 |
| 5,497,701 | A | 3/1996 | Uland | 101/288 |
| 5,499,397 | A | 3/1996 | Wadin et al. | 455/277.1 |
| 5,553,041 | A * | 9/1996 | Inagawa et al. | 369/47.33 |
| 5,554,974 | A | 9/1996 | Brady et al. | 340/572 |
| 5,560,293 | A | 10/1996 | Boreali et al. | 101/288 |
| 5,565,847 | A | 10/1996 | Gambino et al. | 340/572 |
| 5,566,441 | A | 10/1996 | Marsh et al. | 29/600 |
| 5,588,005 | A * | 12/1996 | Ali et al. | 370/346 |
| 5,712,643 | A | 1/1998 | Skladany | 343/700 MS |
| 5,729,201 | A | 3/1998 | Jahnes et al. | 340/572 |
| 5,782,496 | A | 7/1998 | Casper et al. | 283/81 |
| 5,786,626 | A | 7/1998 | Brady et al. | 257/673 |
| 5,812,065 | A | 9/1998 | Schrott et al. | 340/825.54 |
| 5,840,657 | A | 11/1998 | Mehta et al. | 503/204 |
| 5,842,118 | A | 11/1998 | Wood, Jr. | 455/101 |
| 5,874,902 | A | 2/1999 | Heinrich et al. | 340/825.54 |
| 5,923,305 | A | 7/1999 | Sadler et al. | 343/895 |
| 5,942,987 | A | 8/1999 | Heinrich et al. | 340/825.54 |
| 5,956,649 | A * | 9/1999 | Mitra et al. | 455/522 |
| 5,972,156 | A | 10/1999 | Brady et al. | 156/280 |
| 5,973,598 | A | 10/1999 | Beigel | 340/572.1 |
| 5,973,600 | A | 10/1999 | Mosher, Jr. | 340/572.8 |
| 5,982,904 | A | 11/1999 | Eghtesadi et al. | 381/74 |
| 5,993,093 | A | 11/1999 | Schoennauer et al. | 400/621 |
| 6,019,865 | A | 2/2000 | Palmer et al. | 156/265 |
| 6,078,259 | A | 6/2000 | Brady et al. | 340/572.7 |
| 6,104,311 | A * | 8/2000 | Lastinger | 340/10.51 |
| 6,118,379 | A | 9/2000 | Kodukula et al. | 340/572.8 |
| 6,123,796 | A | 9/2000 | Kathmann et al. | 156/249 |
| 6,180,198 | B1 | 1/2001 | Bond | 428/43 |
| 6,210,515 | B1 | 4/2001 | Boreali et al. | 156/250 |
| 6,243,013 | B1 | 6/2001 | Duan et al. | |
| 6,246,326 | B1 | 6/2001 | Wiklof et al. | 340/572.1 |
| 6,259,372 | B1 | 7/2001 | Taranowski et al. | 340/683 |
| 6,278,413 | B1 | 8/2001 | Hugh et al. | 343/818 |
| 6,285,342 | B1 * | 9/2001 | Brady et al. | 343/895 |
| 6,321,986 | B1 | 11/2001 | Ackley | 235/462.01 |
| 6,327,972 | B2 | 12/2001 | Heredia et al. | 101/35 |
| 6,371,375 | B1 | 4/2002 | Ackley et al. | 235/462.45 |
| 6,409,401 | B1 | 6/2002 | Petteruti et al. | 400/88 |
| 6,512,612 | B1 * | 1/2003 | Nelson et al. | 343/700 MS |
| 6,570,386 | B2 | 5/2003 | Goldstein | 324/415 |
| 6,585,437 | B1 | 7/2003 | Wiklof et al. | 400/621 |
| 6,593,853 | B1 | 7/2003 | Barrett et al. | 340/572.1 |
| 6,664,897 | B2 | 12/2003 | Pape et al. | 340/573.3 |
| 6,677,852 | B1 | 1/2004 | Landt | 340/10.1 |
| 6,707,376 | B1 | 3/2004 | Patterson et al. | 340/10.3 |
| 6,899,476 | B1 | 5/2005 | Barrus et al. | 400/76 |
| 6,933,848 | B1 | 8/2005 | Stewart et al. | 340/572.3 |
| 7,323,977 | B2 * | 1/2008 | Kodukula et al. | 340/505 |
| 7,423,539 | B2 * | 9/2008 | Hyde et al. | 340/572.4 |
| 7,499,648 | B2 * | 3/2009 | Draper et al. | 398/37 |
| 7,528,728 | B2 | 5/2009 | Oliver et al. | 340/572.8 |
| 7,579,955 | B2 | 8/2009 | Pillai | |
| 7,667,589 | B2 | 2/2010 | Desmons et al. | 340/522 |
| 2005/0212674 | A1 * | 9/2005 | Desmons et al. | 340/572.7 |
| 2006/0022801 | A1 | 2/2006 | Husak et al. | 340/10.5 |
| 2006/0267731 | A1 | 11/2006 | Chen | 340/10.1 |
| 2007/0081671 | A1 | 4/2007 | Ross, Jr. et al. | 380/255 |
| 2007/0194929 | A1 | 8/2007 | Wagner et al. | |

FOREIGN PATENT DOCUMENTS

| | | |
|---|---|---|
| EP | 0 718 912 A1 | 6/1996 |
| JP | 11-221948 | 8/1999 |
| WO | WO 2007/035863 | 3/2007 |

OTHER PUBLICATIONS

"Alien Squiggle Family of EPC RFID Tags," Alien Technology Corporation, 2005, pp. 1-2.

Atmel Microcontroller with Transponder Interface manual, U9280M-H, 2005.

"Axcess: Radio Frequency Identification Overview," http://www.axcessinc.com/prod_rfidoverview.php, download date Sep. 13, 2006, pp. 1-3.

K.V. Rao et al., "Antenna Design for UHF RFID Tags: A Review and a Practical Application,"*IEEE Transactions on Antennas and Propagation*, vol. 53, No. 12, Dec. 2005, pp. 3870-3876.

Kirman et al., "Stochastic Communication and Coalition Formation," Econometica, vol. 54, No. 1, (Jan. 1986), pp. 129-138.

"Radio-Frequency Identification of Animals—Code Structure," ISO 11784, Second Edition, Aug. 15, 1996.

"Radio-Frequency Identification of Animals—Code Structure—Amendment 1," ISO 11784, Second Edition, Aug. 15, 1996, Amendment 1, Nov. 15, 2004.

"Radio-Frequency Identification of Animals—Technical Concept," ISO 11785, First Edition, Oct. 15, 1996.

"RFID Tags by RFIDSupplyChain.com," URL: http://www.rfidsupplychain.com/Categories.bok?category=RFID+Tags, 2006, download date Jun. 22, 2006, pp. 1-3.

"Smart Dust: Autonomous sensing and communication in a cubic millimeter," http://robotics.eecs.berkeley.edu/~pister/SmartDust/, download date Sep. 13, 2006, pp. 1-6.

Technical Specification: Aircraft-Integrated Data Processing Materials Management-Bar Coding, ISO/TS 21849, First Edition, Jul. 1, 2003.

"Information Technology—Radio Frequency Identification for Item Management: Part 6: Parameters for Air Interface Communications at 860 MHz to 960MHz," ISO/IEC 18000-6, First Edition, Aug. 15, 2004.

"International Technical Standard: Extended Channel Interpretations: Part 1: Identification Schemes and Protocol," AIM Publication ITS/04-001 (May 24, 2004).

"International Symbology Specification—93i," AIM Publication ITS/99-004, Nov. 5, 1999.

"Information Technology—Automatic Identification and Data Capture Techniques—Bar Code Symbology Specifications," International Standard ISO/IEC 15438, First Edition, Sep. 15, 2001.

"Information Technology: Transfer Syntax for High Capacity ADC Media," International Standard ISO/IEC 15434, First Edition, Oct. 1, 1999.

U.S. Appl. No. 11/397,923, filed Apr. 3, 2006, Zimmerman et al.
U.S. Appl. No. 11/464,038, filed Aug. 11, 2006, Pillai.
U.S. Appl. No. 11/775,088, filed Jul. 9, 2007, Ackley et al.
U.S. Appl. No. 60/719,102, filed Sep. 21, 2005, Maltseff et al.
U.S. Appl. No. 60/830,020, filed Jul. 11, 2006, Ackley et al.
U.S. Appl. No. 60/834,314, filed Jul. 28, 2006, Ackley et al.
Maltseff et al., Synchronization of Adaptive Self-Configuring Wireless Network of Transponders U.S. Appl. No. 60/610,759, filed Dec. 1, 2004, 5 pages.

\* cited by examiner

AUTOMATIC DATA COLLECTION DEVICE, METHOD AND ARTICLE

BACKGROUND OF THE INVENTION

1. Field of the Invention

This disclosure generally relates to automatic data collection (ADC) and more particularly to radio-frequency identification.

2. Description of the Related Art

The ADC field is generally directed to the use of devices and methods for automatically capturing data typically encoded in media such as a machine-readable symbol or tag carried by the item to which the data relates. A variety of ADC devices and ADC media are ubiquitous and well known.

For example, a data carrier may take the form of a radio-frequency identification (RFID) tag, which may take the form of a card. Such tags typically include an RFID substrate carrying a circuitry such as a semiconductor device including memory and one or more conductive traces that form an antenna. Typically, RFID tags act as transponders, providing information stored in the semiconductor device in response to a radio-frequency (RF) signal, commonly referred to as an interrogation signal, received at the antenna from a reader or interrogator. Some RFID tags include security measures, such as passwords and/or encryption. Many RFID tags also permit information to be written or stored in the semiconductor memory via an RF signal.

RFID tags that include a discrete power source, for example a battery, are commonly referred to as active devices. RFID devices that rely on an RF signal to derive power are commonly referred to as passive devices. RFID tags may employ both active and passive power sources.

Identification of an RFID device or tag generally depends on RF energy produced by a reader or interrogator arriving at the RFID tag and returning to the interrogator. In general, lower frequencies can penetrate objects better than higher frequencies, but higher frequencies can carry more data than lower frequencies. In addition, multiple protocols exist for use with RFID tags. These protocols may specify, among other things, particular frequencies, frequency ranges, modulation schemes, security schemes, and data formats. Conventional approaches employ multiple RFID tags, each tag using a frequency band and protocol suited to a particular application.

BRIEF SUMMARY OF THE INVENTION

In one aspect, a radio-frequency identification substrate comprises a first radio-frequency identification device, a second radio-frequency identification device, and a controller communicatively coupled to the first radio-frequency identification device and to the second radio-frequency identification device and configured to control the first radio-frequency identification device based at least in part on a state of the second radio-frequency device.

In one embodiment, the controller is further configured to control the second radio-frequency device based at least in part on a state of the first radio frequency device.

In one embodiment, the state of the second radio-frequency identification device is based at least in part on whether the second radio-frequency device has detected a radio-frequency signal. In one embodiment, the controller is configured to activate the first radio-frequency identification device in response to the detection of the radio-frequency signal by the second radio-frequency identification device.

In one embodiment, the controller is configured to control at least one of the radio-frequency identification devices based at least in part on a power signal. In one embodiment, the controller is configured to control at least one of the radio-frequency identification devices based at least in part on a signal indicating an amount of data stored in a memory. In one embodiment, the controller is configured to control at least one of the radio-frequency identification devices based at least in part on a signal indicating a data transmission was not successful.

In one embodiment, the first radio-frequency identification device is configured to operate in accordance with a first protocol and the second radio-frequency device is configured to operate in accordance with the first protocol.

In one embodiment, the first radio-frequency identification device comprises a first integrated circuit, and a first antenna system electrically coupled to the first integrated circuit. In one embodiment, the first integrated circuit comprises a memory, and a power source. In one embodiment, the first antenna system comprises a parasitic element. In one embodiment, the first antenna system comprises a rectilinear portion. In one embodiment, the first antenna system comprises a curved portion. In one embodiment, the first antenna system comprises a first arm electrically coupled to the first integrated circuit, and a second arm electrically coupled to the first integrated circuit. In one embodiment, the first antenna system has an inner perimeter and the second radio-frequency identification device is contained within an area defined by the inner perimeter of the first antenna system. In one embodiment, the second radio-frequency identification device comprises a second integrated circuit, and a second antenna system electrically coupled to the second integrated circuit. In one embodiment, the second radio-frequency identification device comprises a second antenna system electrically coupled to the first integrated circuit.

In one embodiment, the first radio-frequency identification device comprises a first integrated circuit, and a first antenna system comprising a first convex portion electrically coupled to the first integrated circuit, and a second convex portion electrically coupled to the first integrated circuit. In one embodiment, the first convex portion and the second convex portion are configured to form an S-shaped portion of the first antenna system, the first antenna system being electrically coupled to the first integrated circuit between the first and second convex portions. In one embodiment, the S-shaped portion is rectilinear. In one embodiment, the S-shaped portion comprises a curved portion.

In one embodiment, the second radio frequency identification device comprises a second antenna system electrically coupled to the first integrated circuit. In one embodiment, the second antenna system comprises a third convex portion electrically coupled to the first integrated circuit, and a fourth convex portion electrically coupled to the first integrated circuit, wherein the first convex portion and the second convex portion are configured to form a first S-shaped portion of the first antenna system, the first antenna system being electrically coupled to the first integrated circuit along a central portion of the first S-shaped portion, and the third convex portion and the fourth convex portion are configured to form a second S-shaped portion of the second antenna system, the second antenna system being electrically coupled to the first integrated circuit along a central portion of the second S-shaped portion.

In one embodiment, the first radio-frequency identification device is configured to operate in accordance with a first communication protocol and the second radio-frequency identification device is configured to operate in accordance with a second communication protocol. In one embodiment, the first radio-frequency identification device is configured to operate at a first resonant frequency and the second radio-frequency identification device is configured to operate at a second resonant frequency different from the first resonant frequency.

In another aspect, a radio-frequency identification system comprises an interrogator operable to produce an interrogation signal, and a substrate comprising first means for responding to the interrogation signal, second means for responding to the interrogation signal, and means for controlling the first means for responding to the interrogation signal based at least in part on a state of the second means for responding to the interrogation signal.

In one embodiment, the means for controlling is configured to control operation of the second means for responding to the interrogation signal based at least in part on a state of the first means for responding to the interrogation signal. In one embodiment, the first means for responding to the interrogation signal comprises a first integrated circuit, and a first antenna system electrically coupled to the first integrated circuit, wherein the first antenna system has an inner perimeter and the second means for responding is contained within an area on the substrate defined by the inner perimeter of the first antenna system. In one embodiment, the first means for responding to the interrogation signal comprises a first integrated circuit, and a first antenna system comprising a first convex portion, and a second convex portion, wherein the first convex portion and the second convex portion are configured to form an S-shaped portion of the first antenna system, the first antenna system being electrically coupled to the first integrated circuit between the first convex portion and the second convex portion.

In one embodiment, the first means for responding to the interrogation signal is configured to operate in accordance with a first communication protocol and the second means for responding to the interrogation signal is configured to operate in accordance with a second communication protocol. In one embodiment, the first means for responding to the interrogation signal is configured to operate at a first resonant frequency and the second means for responding to the interrogation signal is configured to operate at a second resonant frequency different from the first resonant frequency.

In another aspect, a method of controlling a first radio-frequency identification device on a substrate comprises determining, on the substrate, a state of a second radio-frequency identification device on the substrate, generating, on the substrate, a control signal based at least in part on the determined state of the second radio-frequency identification device, and controlling the first radio-frequency identification device on the substrate based at least in part on the control signal. In one embodiment, determining the state of the second radio-frequency identification device comprises determining whether an interrogation signal has been received by the second radio-frequency identification device. In one embodiment, determining the state of the second radio-frequency identification device comprises determining a state of a memory. In one embodiment, determining a state of the second radio-frequency device comprises determining a state of a power supply.

In one embodiment, the method further comprises controlling the second radio-frequency identification device based at least in part on a state of the first radio-frequency identification device. In one embodiment, controlling the first radio-frequency identification device comprises enabling the first radio-frequency identification device in response to receipt of the interrogation signal by the second radio-frequency identification device. In one embodiment, the method further comprises disabling the first radio-frequency identification device when a first criteria is satisfied.

In another aspect, a method of operating a radio-frequency identification system comprises receiving a first response signal from a first radio-frequency identification device of a radio-frequency identification tag in response to an interrogation signal, when the first response signal is received, processing the first response signal, determining whether a second response signal is received from a second radio-frequency identification device of the radio-frequency identification tag, and when the first response signal is received and it is determined that the second response signal is not received, initiating error processing. In one embodiment, the first response signal is in a first frequency range and the second response signal is in a second frequency range different from the first frequency range. In one embodiment, the first frequency range is lower than the second frequency range. In one embodiment, the interrogation signal comprises a first component signal at a first frequency and a second component signal at a second frequency different from the first frequency. In one embodiment, determining whether the second response signal is received comprises determining whether the second response signal is received within a defined period of time of receipt of the first response signal.

In another aspect, a radio-frequency identification substrate comprises a first radio-frequency identification device on the substrate and configured to operate in accordance with a first communication protocol, and a second radio-frequency identification device on the substrate and configured to operate in accordance with a second communication protocol different from the first communication protocol. In one embodiment, the first radio-frequency identification device comprises a first integrated circuit, and a first antenna system electrically coupled to the first integrated circuit. In one embodiment, the first integrated circuit comprises a data system, and a power system. In one embodiment, the first antenna system comprises a parasitic element. In one embodiment, the first antenna system comprises a first antenna trace, and a second antenna trace electrically coupled to the first antenna trace and extending from the first antenna trace in a direction approximately perpendicular to the first antenna trace. In one embodiment, the first antenna system has an inner perimeter and the second radio-frequency identification device is contained within an area on the substrate defined by the inner perimeter of the first antenna system. In one embodiments the second radio-frequency identification device comprises a second integrated circuit, and a second antenna system electrically coupled to the second integrated circuit.

In one embodiment, the substrate further comprises a controller on the substrate communicatively coupled to the first and second radio-frequency identification devices and configured to control at least one of the radio-frequency identification devices.

In one embodiment, the first radio-frequency identification device comprises a first integrated circuit, and a first antenna system comprising a first convex portion electrically coupled to the first integrated circuit, and a second convex portion electrically coupled to the first integrated circuit. In one embodiment, the first convex portion and the second convex portion are configured to form an S-shaped portion of the first antenna system, the first antenna system being electrically coupled to the first integrated circuit between the first convex portion and the second convex portion. In one embodiment, the S-shaped portion is rectilinear. In one embodiment, the first convex portion comprises a first segment electrically coupled to the first integrated circuit and extending from the integrated circuit in a first direction, and a second segment electrically coupled to the first segment and extending from the first segment in second direction generally perpendicular to the first direction. In one embodiment, the second radio frequency identification device comprises a second antenna system electrically coupled to the first integrated circuit. In one embodiment, the second antenna system comprises a third convex portion, and a fourth convex portion, wherein the first convex portion and the second convex portion are configured to form a first S-shaped portion of the first antenna system, the first antenna system being electrically coupled to the first integrated circuit between the first convex portion and the second convex portion, and the third convex portion and the fourth convex portion are configured to form a second S-shaped portion of the second antenna system, the second antenna system being electrically coupled to the first integrated circuit between the third convex portion and the fourth convex portion.

In one embodiment, the first radio-frequency identification device and the second radio-frequency identification device share a common memory. In one embodiment, the first radio-frequency identification device is configured to operate at a first resonant frequency and the second radio-frequency identification device is configured to operate at a second resonant frequency different from the first resonant frequency.

In another aspect, a radio-frequency identification device comprises an integrated circuit, and a first antenna system comprising a first S-shaped portion, the first S-shaped portion comprising a first convex portion, and a second convex portion, wherein the first S-shaped portion is electrically coupled to the integrated circuit between the first convex portion and the second convex portion of the first S-shaped portion. In one embodiment, the first S-shaped portion is rectilinear. In one embodiment, the first S-shaped portion comprises a curved portion. In one embodiment, the first antenna system further comprises a parasitic element.

In one embodiment, the first convex portion comprises a first segment electrically coupled to the integrated circuit, extending from the integrated circuit in a first direction, and having a first width and a first length, a second segment electrically coupled to the first segment, extending from the first segment in a second direction approximately perpendicular to the first direction, and having a second width and a second length, and a third segment electrically coupled to the second segment, extending from the second segment in third direction generally opposite to the first direction, and having a third width and a third length. In one embodiment, the second convex portion comprises a fourth segment electrically coupled to the integrated circuit, extending from the integrated circuit in the third direction, and having a fourth width and a fourth length, a fifth segment electrically coupled to the fourth segment, extending from the fourth segment in a fourth direction generally opposite to the second direction, and having a fifth width and a fifth length, and a sixth segment electrically coupled to the fifth segment, extending from the fifth segment in the first direction, and having a sixth width and a sixth length. In one embodiment, the first width is equal to the fourth width, the first length is equal to the fourth length, the second width is equal to the fifth width, the second length is equal to the fifth length, the third width is equal to the sixth width, and the third length is equal to the sixth length. In one embodiment, the second width is equal to the third width, and the first length is equal to the third length.

In one embodiment, the first convex portion comprises a copper trace. In one embodiment, the first convex portion comprises a silver ink trace.

In one embodiment, the first convex portion comprises a first segment electrically coupled to the integrated circuit, extending from the integrated circuit in a first direction, and having a first width and a first length, and a first return segment electrically coupled to the first segment, extending from the first segment in a second direction, and having a second width, a second length and a first curvature. In one embodiment, the second convex portion comprises a second segment electrically coupled to the integrated circuit, extending from the integrated circuit in a third direction opposite from the first direction, and having a third width and a third length, and a second return segment electrically coupled to the second segment, extending from the first segment in a fourth direction, and having a fourth width, a fourth length and a second curvature.

In one embodiment, the first antenna system further comprises a second S-shaped portion, the second S-shaped portion comprising a third convex portion, and a fourth convex portion, wherein the second S-shaped portion is electrically coupled to the integrated circuit between the third convex portion and the fourth convex portion of the second S-shaped portion. In one embodiment, the third convex portion is in a plane of the first convex portion and rotated approximately 90 degrees from the first convex portion with respect to the integrated circuit.

In one embodiment, the radio-frequency identification device further comprises a second antenna system comprising a second S-shaped portion, the second S-shaped portion comprising a third convex portion, and a fourth convex portion. In one embodiment, the third convex portion is in a plane of the first convex portion and rotated with respect to the first convex portion. In one embodiment, the third convex portion is rotated ninety degrees with respect to the first convex portion. In one embodiment, the second S-shaped portion is electrically coupled to the integrated circuit between the third convex portion and the fourth convex portion of the second S-shaped portion.

In another aspect, a method of making a radio-frequency identification device comprises printing a first convex portion of an S-shaped portion of an antenna system on a substrate, printing a second convex portion of the S-shaped portion of the antenna system on the substrate, and electrically coupling the antenna system to an integrated circuit between the first convex portion and the second convex portion of the antenna system. In one embodiment, printing the first convex portion comprises printing a first segment extending in a first direction and having a first width and a first length, printing a second segment extending from the first segment in a second direction approximately perpendicular to the first direction and having a second width and a second length, and printing a third segment extending from the second segment in a third direction opposite from the first direction and having a third width and a third length. In one embodiment, modifying the first length modifies a performance characteristic of the radio-frequency identification device.

In another aspect, a system for manufacturing a radio-frequency identification device comprises means for printing segments of an antenna system on a substrate and means for controlling the means for printing configured to control the width, length and direction of segments printed by the means for printing and to cause the means for printing to print segments forming first and second convex portions of the antenna system, the first and second convex portions forming an S-shaped portion of the antenna system, the S-shaped portion configured for electrical coupling between the first and second convex portions. In one embodiment, the means for printing comprises a trace printer operable to deposit a conductive ink on selected portions of the substrate.

In another aspect, a computer-readable memory medium stores instructions for causing a control system to control a trace printer by generating control signals causing the trace printer to print a first convex antenna trace on a substrate, and print a second convex antenna trace on the substrate, wherein the first convex antenna trace and the second convex antenna-trace together form a first S-shaped portion of an antenna system, the first S-shaped portion adopted for electrical coupling of the antenna system between the first and second convex antenna traces. In one embodiment, the stored instructions include instructions for generating control signals to cause the trace printer to print a first segment of the first convex antenna trace, the first segment having a first width and a first length and extending in a first direction, print a second segment of the first convex antenna trace, the second segment having a second width and a second length and extending from an end portion of the first segment in a second direction perpendicular to the first direction, and print a third segment of the first convex antenna trace, the third segment having third width and a third length and extending from an end portion of the second segment in a third direction opposite of the first direction. In one embodiment, the stored instructions include instructions for generating control signals to cause the trace printer to print a first segment of the first convex antenna trace, the first segment having a first width and a first length and extending in a first direction, and print a first return segment of the first convex antenna trace, the first return segment extending from an end portion of the first segment in a second direction, and having a second width, a second length and a first curvature. In one embodiment, the stored instructions further include instructions for generating control signals to cause the trace printer to print a third convex antenna trace on the substrate, the third convex antenna trace rotated approximately 90 degrees with respect to the first convex antenna trace, and print a fourth convex antenna trace on the substrate, wherein the third convex antenna trace and the fourth convex antenna trace together form a second S-shaped portion of the antenna system, the second S-shaped portion adopted for electrical coupling of the antenna system between the third and fourth convex antenna traces.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

DETAILED DESCRIPTION OF THE INVENTION

In the following description, certain details are set forth in order to provide a thorough understanding of various embodiments of devices, methods and articles. However, one of skill in the art will understand that other embodiments may be practiced without these details. In other instances, well-known structures and methods associated with RFID tags, RFID devices, RFID substrates, semiconductor devices, interrogators, RF signals, and antennas have not been shown or described in detail to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is as "including, but not limited to."

Reference throughout this specification to "one embodiment," or "an embodiment" means that a particular feature, structure or characteristic described in connection with the embodiment is included in at least one embodiment. Thus, the appearances of the phases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claimed invention.

Figure 1:
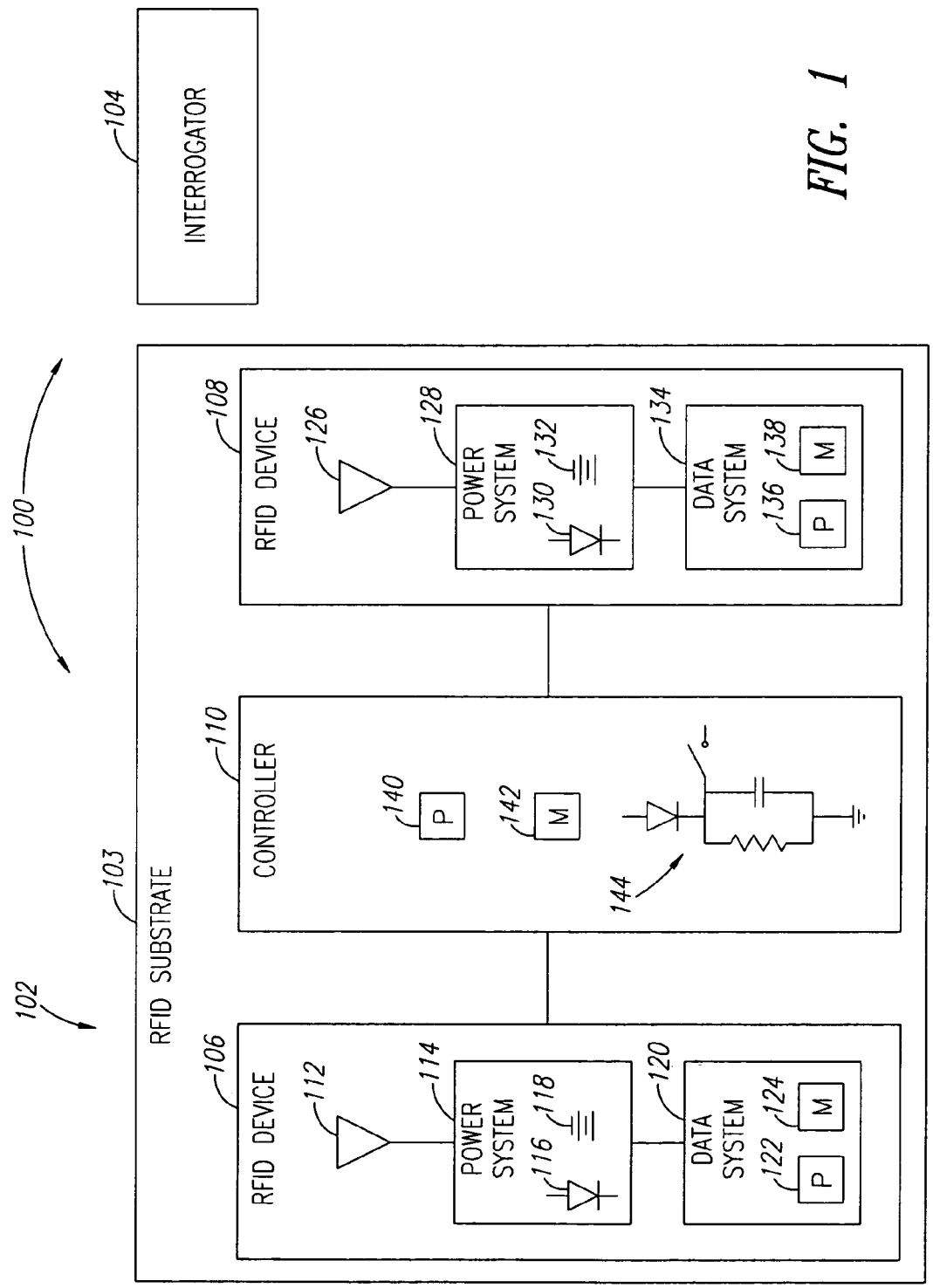
FIG. 1 is a functional block diagram of an embodiment of a radio-frequency identification system.

FIG. 1 is a functional block diagram of an RFID system 100 comprising an RFID tag 102, which may take the form of a card, and a reader or interrogator 104. The RFID tag 102 comprises an RFID substrate 103 comprising a first RFID device or module 106, a second RFID device or module 108 and a controller 110. The first RFID device 106 is communicatively coupled to the second RFID device 108 by the controller 110. The controller 110 may be configured to use a state of the RFID tag 102, such as a state of the first RFID device 106, to control operation of the RFID tag 102. For example, the RFID tag 102 may use a state of the first RFID device 106 to control operation of the second RFID device 108, to use a state of the second RFID device 108 to control operation of the first RFID device 106, to use a state of both RFID devices to control operation of one of the RFID devices, and/or to use a state of both RFID device to control operation of both RFID devices. For example, the first RFID device 106 may be configured to detect the presence or absence of RF energy in a particular band, such as a high-frequency RF band, and the controller 110 may be configured to activate or deactivate the second RFID device 108 in response to the detection by the first RFID device 106.

The first RFID device 106 as illustrated comprises an antenna system 112, which as illustrated comprises an antenna, a power system 114, which as illustrated comprises an optional rectifier 116 and an optional battery 118, and a data system 120, which as illustrated comprises a processor 122 and a memory 124. The antenna system 112 sends and receives radio frequency signals and may comprise multiple antennas, multiple antenna arms, and parasitic elements, as illustrated by the examples discussed in more detail below. The power system 114 provides power to the first RFID device 106 and may be configured to provide power in a passive and/or an active manner. The data system 120 is configured to generate output signals in response to signals received from the antenna system 112 and/or the controller 110. In some embodiments, the data system 120 may comprise discrete circuitry in addition to, or instead of, the illustrated processor 122 and/or the memory 124.

The second RFID device 108 as illustrated comprises an antenna system 126, which as illustrated comprises an antenna, a power system 128, which as illustrated comprises a rectifier 130 and a battery 132, and a data system 134, which as illustrated comprises a processor 136 and a memory 138. The antenna system 126 sends and receives radio frequency signals and may comprise multiple antennas, multiple antenna arms, and parasitic elements, as illustrated by the examples discussed in more detail below. The power system 128 provides power to the second RFID device 108 and may be configured to provide power in a passive and/or an active manner. The data system 134 is configured to generate output signals in response to signals received from the antenna system 126 and/or from the controller 110. In some embodiments, the data system 134 may comprise discrete circuitry in addition to, or instead of, the illustrated processor 136 and/or the memory 138.

The controller 110 as illustrated comprises a processor 140, a memory 142 and discrete circuitry 144, such as a switch and/or an RC circuit. In some embodiments, the controller 110 may comprise only discrete components. The controller 110 may draw power from one or both of the RFID devices 106, 108, may have its own passive and/or active power system, and/or the controller 110 may be incorporated into one of the RFID devices 106, 108.

The RFID devices 106, 108 and the controller 110 of the RFID tag 102 need not have separate antenna systems, power systems and data systems, but may, for example, share one or more modules and/or systems in some embodiments. For example, a single processor and a shared memory may be employed in some embodiments with the RFID devices 106, 108 and the controller 110 implemented as software stored in the memory, which may consist of separately identifiable subroutines. The power systems 114, 128, need not have both active and passive sources. For example, the power system 114 of the first RFID device 106 may have a passive power source while the power system 128 of the second RFID device 108 may have an active power source.

Figure 2:
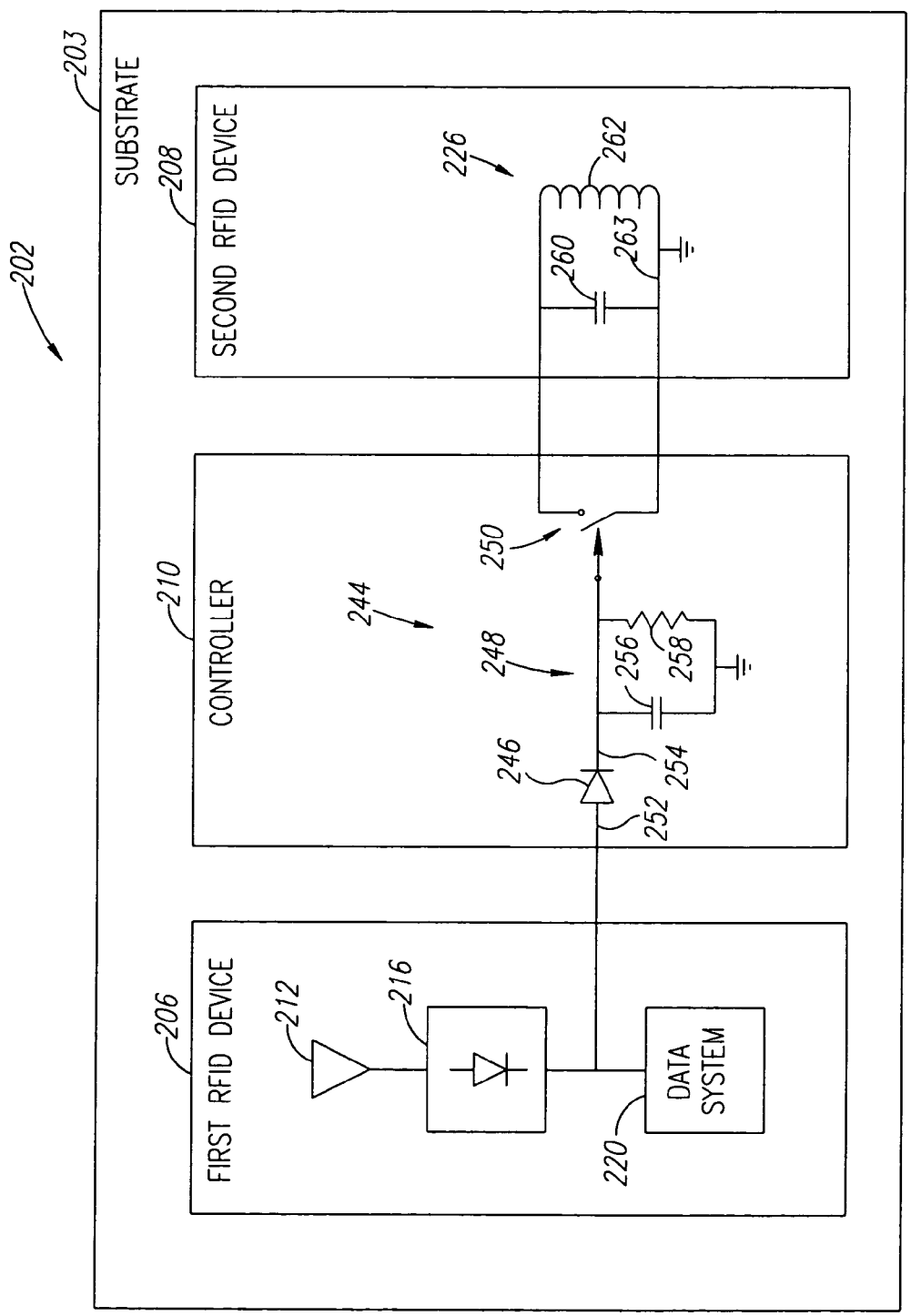
FIG. 2 is a functional block diagram of another embodiment of a radio-frequency identification system.

FIG. 2 is a schematic diagram of an embodiment of an RFID tag 202. The RFID tag 202 comprises a substrate 203, a first RFID device or module 206, a second RFID device or module 208 and a controller 210. The first RFID device 206 comprises a high-frequency antenna 212 electrically coupled to a rectifier 216, and a data system 220.

The controller 210 comprises discrete circuitry 244. The discrete circuitry 244 comprises a diode 246, an RC circuit 248 and a switch 250. The diode 246 is coupled to the rectifier 216 at a first end 252 and to the RC circuit 248 at a second end 254. The RC circuit 248 comprises a capacitor 256 and a resistor 258 coupled in parallel between the second end 254 of the diode 246 and a reference voltage. The switch 250 is controlled by a signal taken off the second end 254 of the diode 246.

The second RFID device 208 comprises a low-frequency antenna system 226 comprising a second capacitor 260 and an inductor 262 coupled in parallel across the switch 250 and at one end 263 to the reference voltage. The embodiment of an RFID tag 202 illustrated in FIG. 2 may be advantageously employed to detect whether a high-frequency response signal from the RFID tag 202 has not been received by an interrogator (see interrogator 104 in FIG. 1), for example, by using the method described below with respect to FIG. 4.

Figure 3:
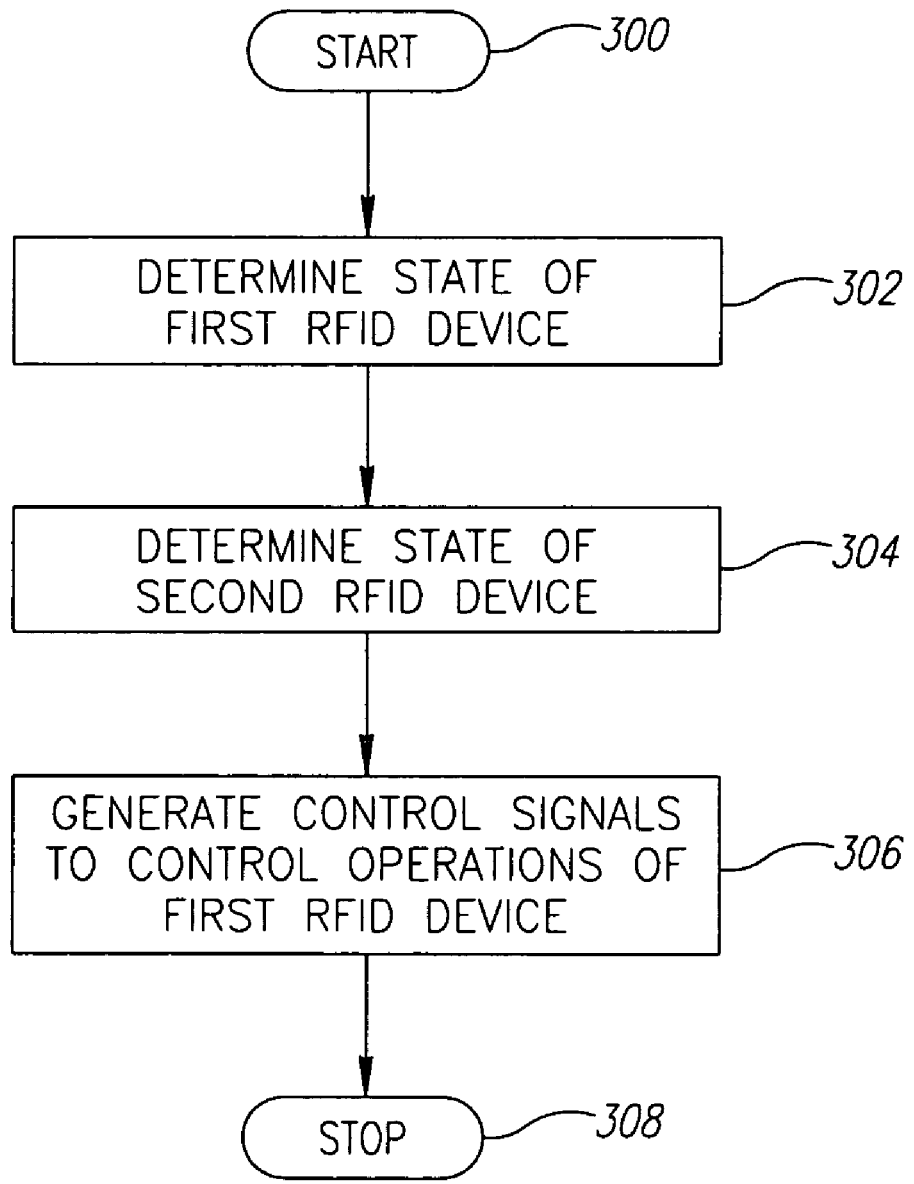
FIG. 3 is a flow diagram illustrating an embodiment of a method of operating a radio-frequency identification system.

FIG. 3 is a flow diagram illustrating a method of operating an RFID system, such as the RFID system 100 illustrated in FIG. 1, to control operation of a first RFID device, such as RFID device 106, based on a state of the first RFID device 106, and on a state of the second RFID device 108. The method starts at 300 and proceeds to 302.

At 302, the system 100 determines a state of operation of the first RFID device 106. The state of the first RFID device 106 may be determined, for example, by the presence or absence of a signal received by the first RFID device 106, a value stored in the memory 124 of the first RFID device 106, the presence or absence of a signal from the power system 114, such as a signal indicating a level of available power, a signal from the data system 120, such as a signal indicating an amount of data stored in the memory 124 or a signal indicating data stored in the memory 124 has been successfully transferred, or has not been successfully transferred, an indication the first RFID device 106 has failed, and/or by various combinations thereof. The method proceeds from 302 to 304.

At 304, the system 100 determines a state of operation of the second RFID device 108. The state of the second RFID device 108 may be determined, for example, by the presence or absence of a signal received by the second RFID device 108, a value stored in the memory 138 of the second RFID device 108, the presence or absence of a signal from the power system 128, such as a signal indicating a level of available power, a signal from the data system 134, such as a signal indicating an amount of data stored in the memory 138 or a signal indicating data stored in the memory 138 has been successfully transferred, or has not been successfully transferred, an indication that the second RFID device 108 has failed, and/or by various combinations thereof. The method proceeds from 304 to 306.

At 306, the system 100 generates control signals to cause the first RFID device 106 to operate in a desired manner based on the state of the first RFID device 106 determined at 302 and the state of the second RFID device determined at 304. A look-up table may be employed to generate the control signals. The control signals may be generated by the controller 110, by the first RFID device 106, by the second RFID device 108, by the interrogator 104, and/or by combinations thereof. The manner of operation of the first RFID device 106 may include, for example, no operation, a low-power mode of operation, a high-power mode of operation, operation in accordance with a first communication protocol, operation in accordance with a second communication protocol, operation in first frequency band, and/or operation in a second frequency band. The method proceeds from 306 to 308, where the method terminates.

Figure 4:
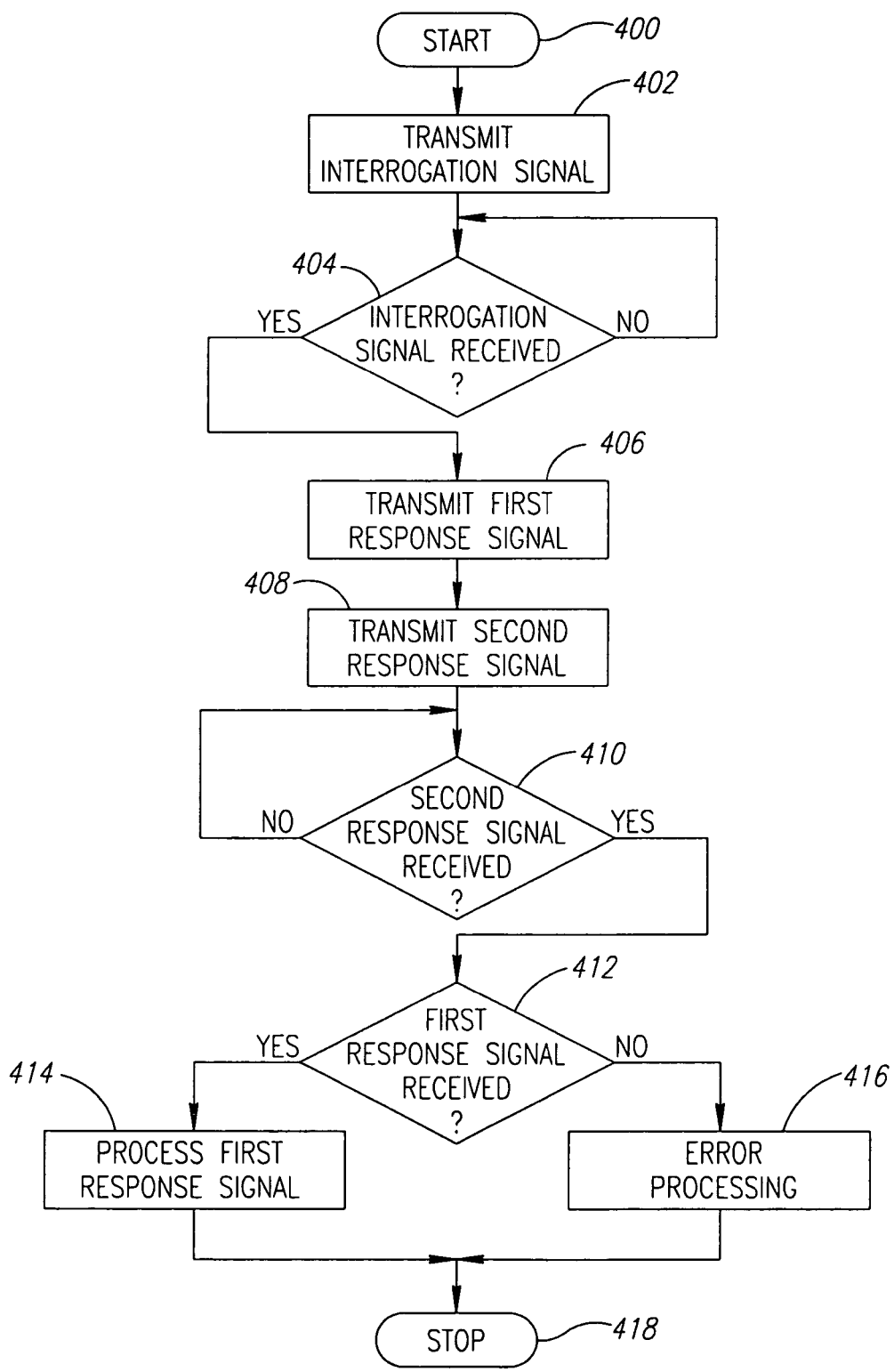
FIG. 4 is a flow diagram illustrating an embodiment of a method of operating a radio-frequency identification system.

The system 100 of FIG. 1 can be used, for example, to prevent a first frequency RFID signal, such as a high-frequency RFID signal, from being missed by an interrogator when a second frequency RFID signal, such as a low-frequency RFID signal, would be detected. FIG. 4 is a flow diagram illustrating a method for using an embodiment, such as the embodiment of FIG. 1, to prevent a first frequency RFID device, such as the RFID device 106 of RFID tag 102, from being missed by an interrogator, such as the interrogator 104. For example, an individual wearing or an item bearing an RFID tag might pass an interrogator and a high-frequency response signal from the RFID tag would not be received by the interrogator. The signal could be blocked, for example, by another person or another RFID tag signal.

The method starts at 400 and proceeds to 402. At 402, the interrogator 104 transmits an interrogation signal directed to the RFID tag 102. The interrogation signal may be, for example, a high frequency signal directed to the first RFID device 106, a low-frequency signal directed to the second RFID device 108, or may contain more than one component interrogation signal. The method proceeds to 404. At 404, the system 100 determines whether the interrogation signal has been received by the RFID tag 102. If an interrogation signal has not been received by the RFID tag 102 at 404, the method returns to 404.

If the interrogation signal has been received at 404, the method proceeds to 406, where the first RFID device 106 begins transmitting a first response signal. The method proceeds to 408, where the second RFID device 108 begins transmitting a second response signal. The method proceeds from 408 to 410. At 410, the system 100 determines whether the second response signal has been received by the interrogator 104. If the second response signal has been received by the interrogator 104, the method proceeds to 412.

If the second response signal has not been received by the interrogator 104 at 410, the method returns to 410. In some embodiments, instead of returning to 410, the method may return to 402 and the system may retransmit the interrogation signal or the method may proceed to 416 for error processing.

At 412, the system 100 determines whether the first response signal has been received by the interrogator 104. If the system 100 determines the first response signal has been received by the interrogator 104, the method proceeds to 414, where the system 100 processes the first response signal. The method then terminates at 418.

If the system 100 determines at 412 that the first response signal has not been received by the interrogator 104, the method proceeds to 416, for error processing. For example, the system 100 may sound an alarm (not shown) or the method may return to 402 for retransmission of the interrogation signal by the system 100. The method then terminates at 418.

Figure 5:
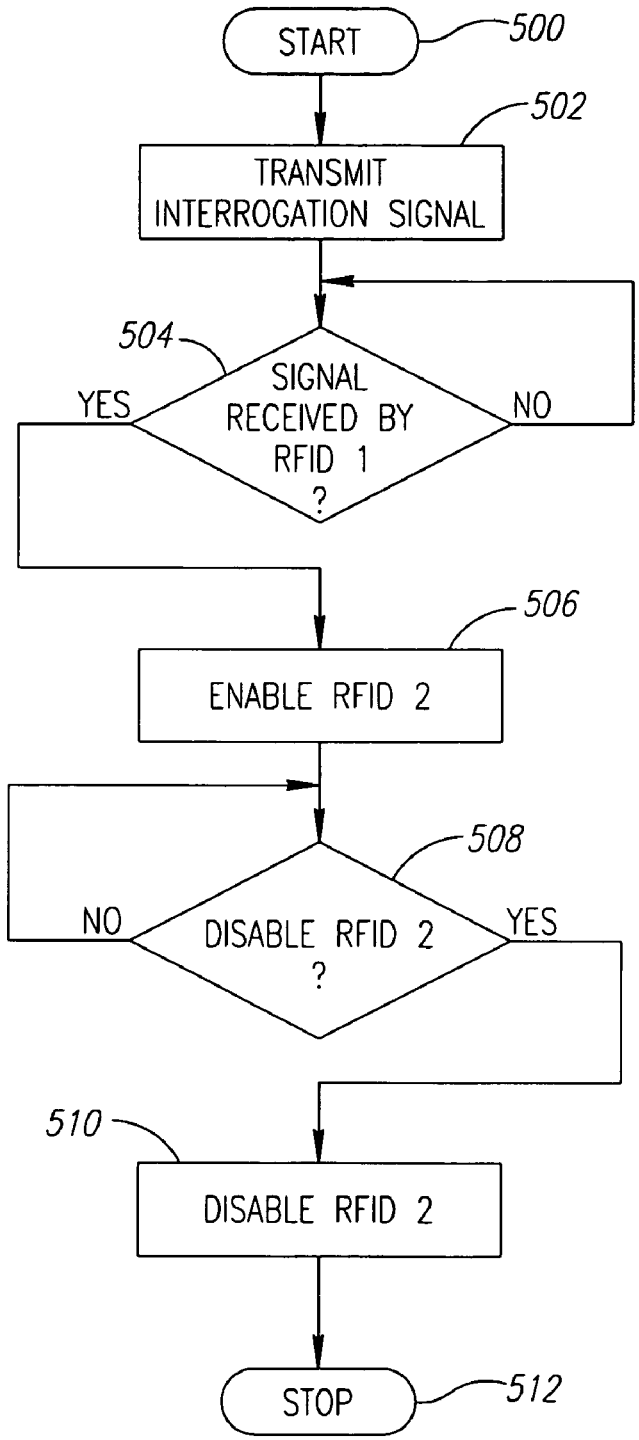
FIG. 5 is a flow diagram illustrating an embodiment of a method of operating a radio-frequency identification system.

FIG. 5 is a flow diagram illustrating a method for conserving battery power of an RFID tag, such as the RFID tag 102 of FIG. 1. The method starts at 500 and proceeds to 502, where the interrogator 104 transmits an interrogation signal. The method proceeds to 504, where the system 100 determines whether the interrogation signal has been received by the first RFID device 106, which may be a passive RFID device. If the system 100 determines at 504 that the interrogation signal has not been received by the first RFID device 106, the method returns to 504.

If the system 100 determines the interrogation signal has been received by the first RFID device 106, the method proceeds from 504 to 506, where the controller 110 enables the second RFID device 108, which may be an active RFID device. Alternatively, the controller 110 may enable a high-power mode of the second RFID device 108. The method proceeds from 506 to 508, where the system 100 determines whether a criteria for disabling the second RFID device 108 has been satisfied, such as, for example, a time-out period, receipt of an acknowledgement signal or discontinuance of the interrogation signal. If the system 100 determines the criteria for disabling the second RFID device 108 has not been satisfied, the method returns to 508.

If the system 100 determines at 508 that the criteria for disabling the second RFID device 108 has been satisfied, the method proceeds from 508 to 510, where the system 100 disables the second RFID device 108, or alternatively, the system 100 disables the high-power mode of the second RFID device 108. The method proceeds from 510 to 512, where the method terminates.

Embodiments of the methods discussed in FIGS. 3, 4 and 5 may contain additional acts not shown in FIGS. 3, 4 and 5, may not contain all of the acts shown in FIGS. 3, 4 and 5, may perform acts shown in FIGS. 3, 4 and 5 in various orders, and may combine acts shown in FIGS. 3, 4 and 5. For example, the embodiment illustrated in FIG. 3 may be modified to generate control signals to control operation of the first RFID-device 106 based solely on the state of the second RFID device 108. In another example, the embodiment illustrated in FIG. 5 may be modified to determine whether other criteria are satisfied before enabling the second RFID device at 506. For example, there may be no data to transmit or insufficient data to justify the use of a higher power level or a higher frequency RFID device, or the conditions may be such that a high-frequency signal would not be received by the interrogator 104.

Figure 6:
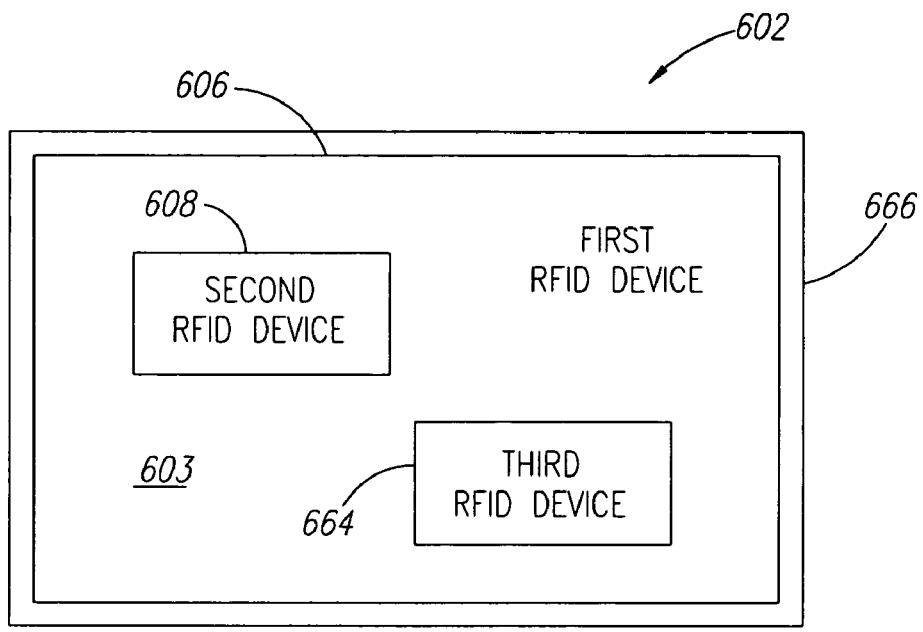
FIG. 6 is a top plan view of an embodiment of an RFID tag.

FIG. 6 is a top plan view of an embodiment of an RFID tag 602 comprising a first RFID device 606, a second RFID device 608 and a third RFID device 664 on a substrate 603 in a single casing or package 666. The second RFID device 608 and the third RFID device 664 are contained within an area on the substrate 603 defined by the first RFID device 606. The RFID devices 606, 608, 664 can employ separate antenna systems (see antenna system 112 of FIG. 1), or may employ a common antenna system. The RFID devices 606, 608, 664 may comprise separate integrated circuits or chips, or may share a single chip. The RFID devices 606, 608, 664 may be configured to operate in different frequency bands using different protocols as desired, or may be configured to operate under the same protocol and/or combinations thereof. For example, the first RFID device 606 may be configured to operate in accordance with a first protocol, while the second RFID device 608 and the third RFID device 664 are configured to operate in accordance with a second protocol, different from the first protocol.

Figure 7:
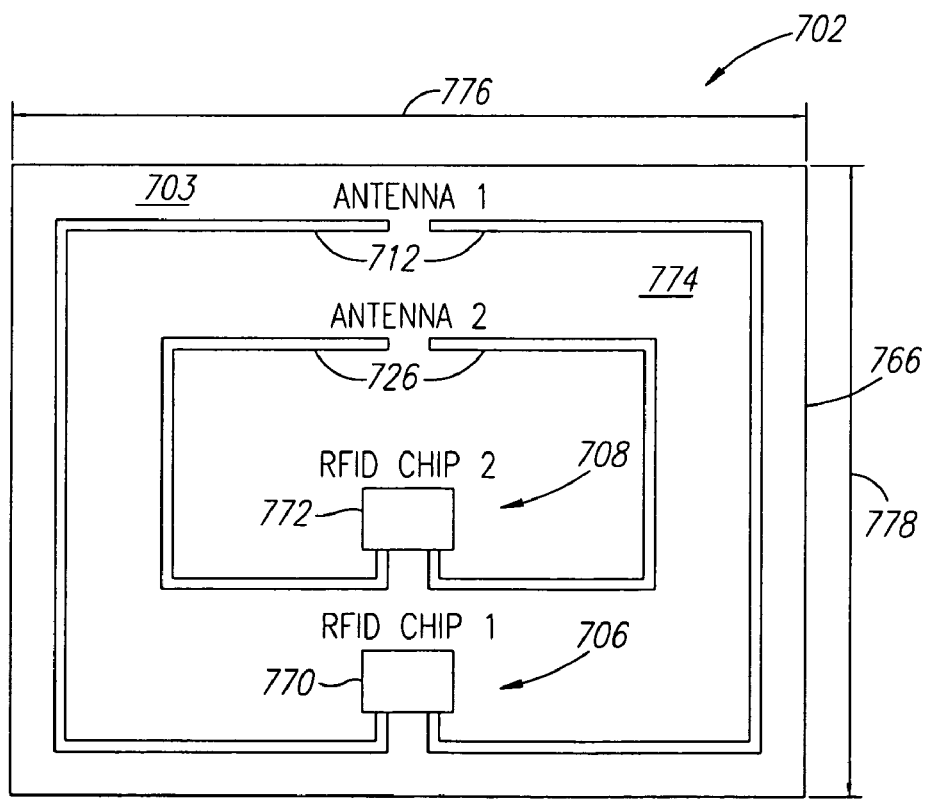
FIG. 7 is a top plan view of an embodiment of an RFID tag.

FIG. 7 is a top plan view of an embodiment of an RFID tag 702 comprising a substrate 703 comprising a first RFID device 706 comprising a first integrated circuit or chip 770 and a first antenna system 712 contained within a package 766. A second RFID device 708 comprising a second integrated circuit or chip 772 and a second antenna system 726 is contained within an area 774 defined by the first RFID device 706. The first RFID device 706 and the second RFID device 708 may be configured to operate using different protocols and/or different frequencies. For example, the first RFID device 706 may be configured to operate under, for example, ISO class 0, while the second RFID device 708 is configured to operate under, for example, ISO class 1, generation 2. In another example, the first RFID device 706 may be configured to operate at, for example, 433 MHz or 915 MHz, while the second RFID device 708 may be configured to operate at, for example, 134.2 KHz, 13.56 MHZ or 2.45 GHz. An RFID tag 702 as illustrated in FIG. 7 with RFID devices 706, 708 configurable to operate at some of the example frequencies can be integrated into a single substrate 703 with a length 776 of, for example, 50 mm, and a width 778 of, for example, 50 mm, with little mutual interference.

Figure 8:
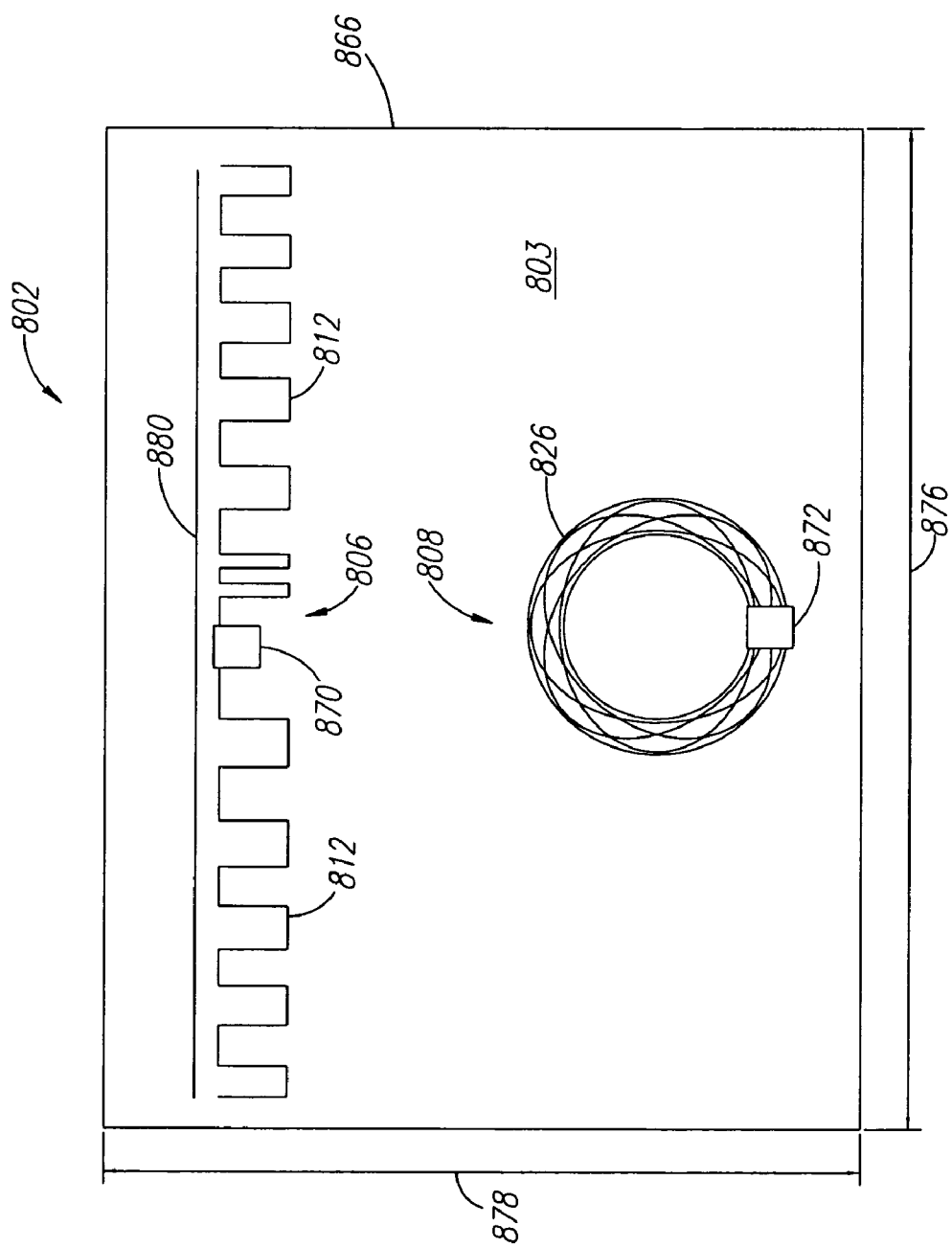
FIG. 8 is a top plan view of an embodiment of an RFID tag.

FIG. 8 is a top plan view of an embodiment of an RFID tag 802 comprising a first RFID device 806 and a second RFID device 808 in a package 866. The first RFID device 806 comprises a first integrated circuit or chip 870, a first antenna system 812, and a first parasitic element 880. The second RFID device 808 comprises a second integrated circuit or chip 872 and a second antenna system 826. The first RFID device 806 and the second RFID device 808 of the embodiment of FIG. 8 may also be configured to operate using different protocols and/or different frequencies, as discussed above, for example, with regard to FIG. 7, and can be integrated into a single substrate 803 with a length 876 of, for example, 50 mm and a width 878 of, for example, 50 mm with little mutual interference.

Figure 9:
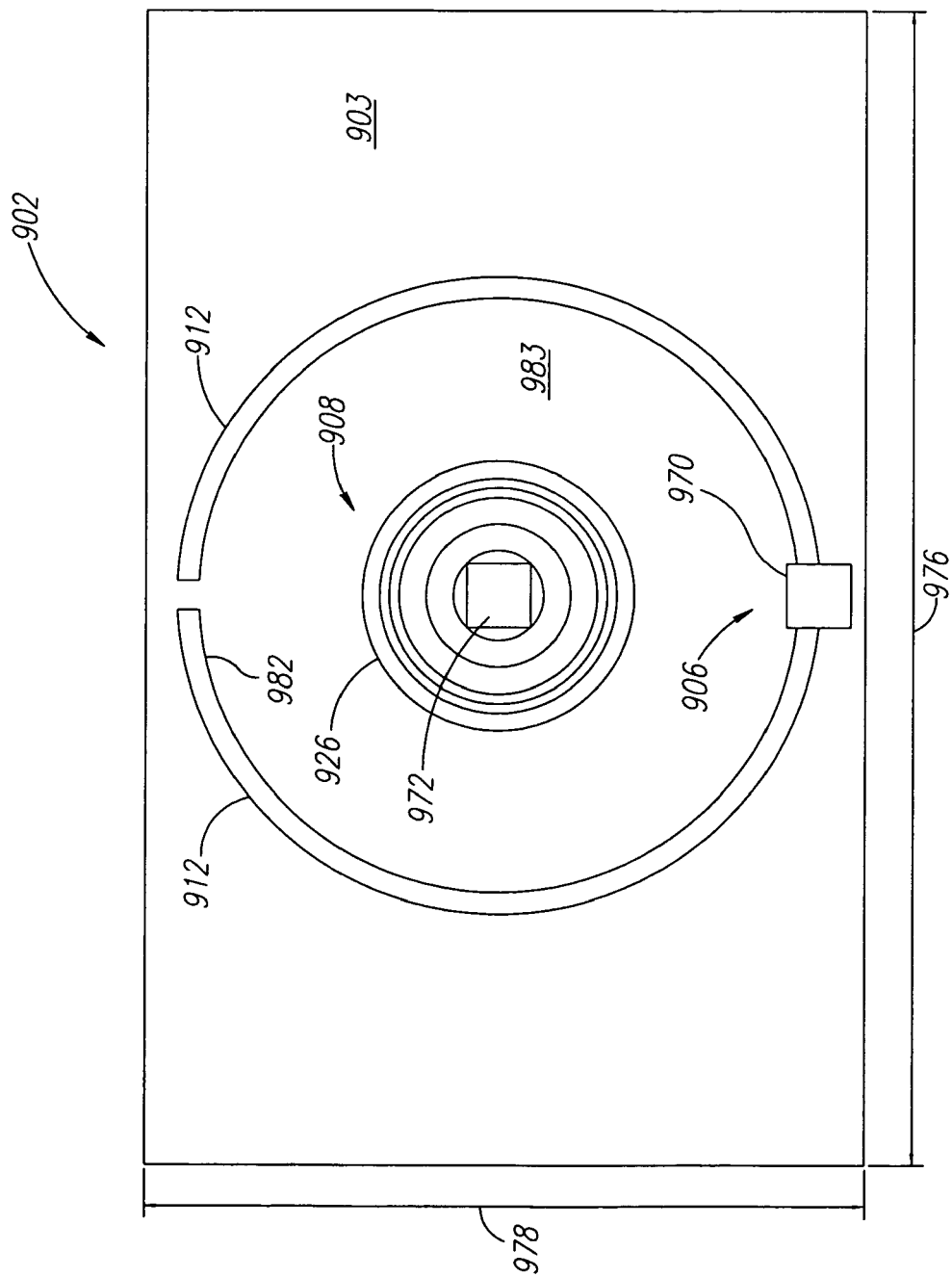
FIG. 9 is a top plan view of an embodiment of an RFID tag.

FIG. 9 is a top plan view of an embodiment of an RFID tag 902 comprising a first RFID device 906 and a second RFID device 908. The first RFID device 906 comprises a first integrated circuit or chip 970 and a first antenna system 912 having a substantially circular inner perimeter 982. The second RFID device 908 is contained within an area 983 defined by the inner perimeter 982 of the first RFID device 906 and comprises a second integrated circuit or chip 972 and a second antenna system 926. The first RFID device 906 and the second RFID device 908 of the embodiment of FIG. 9 may also be configured to operate using different protocols and/or different frequencies, as discussed above, for example, with regard to FIG. 7, and can be integrated into a single substrate 903 with a length 976 of, for example, 50 mm and a width 978 of, for example, 50 mm with little mutual interference.

Figure 10:
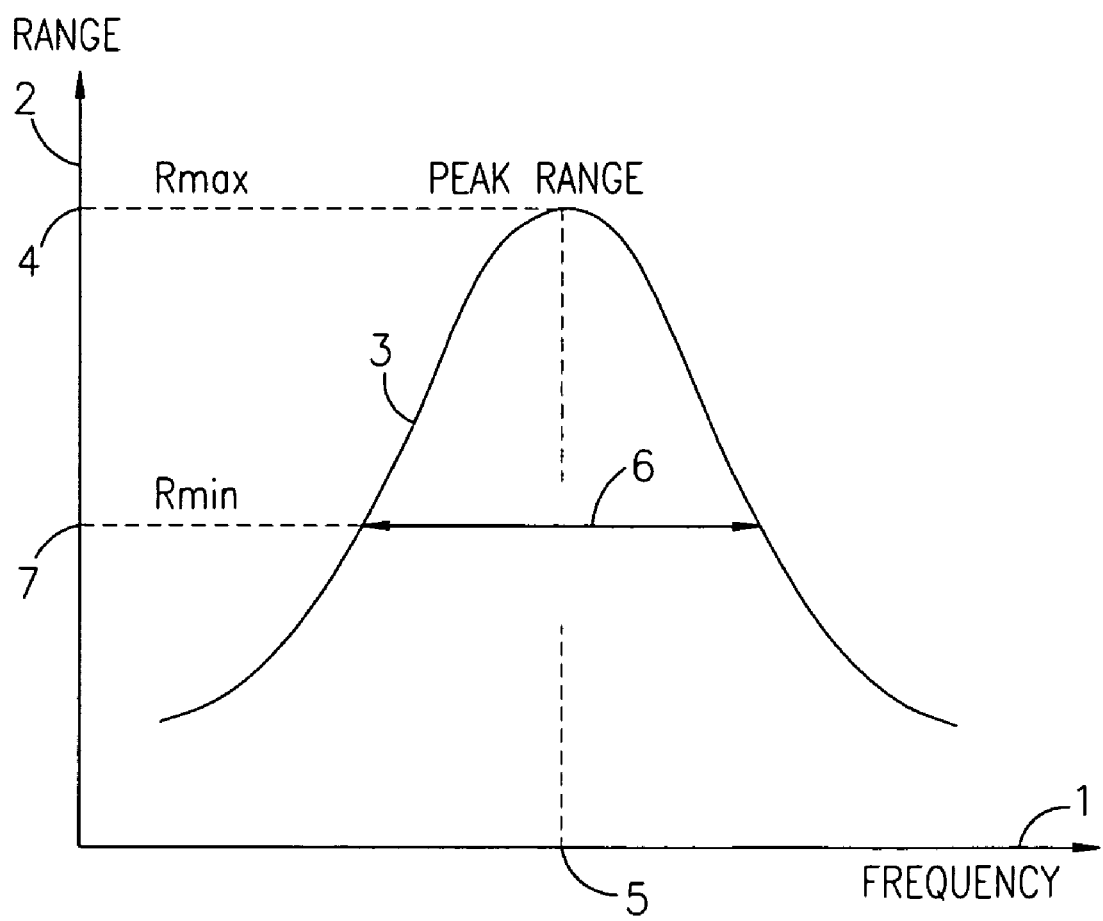
FIG. 10 is graphical representation of performance characteristics of an RFID tag.

Some important RFID tag performance characteristics include the peak range of the tag, the resonant frequency of the tag, and the range width of the tag. These characteristics are illustrated in a graphical form in FIG. 10 for a tag with a single RFID device. Frequency is plotted along the horizontal axis 1. Range is plotted along the vertical axis 2. The curve 3 represents the range of the RFID tag as a function of frequency. The peak range 4 of the RFID tag occurs at the resonant frequency 5 of the RFID tag. The range width 6 is the frequency bandwidth in which the RFID tag read range is above a threshold minimum 7.

Figure 11:
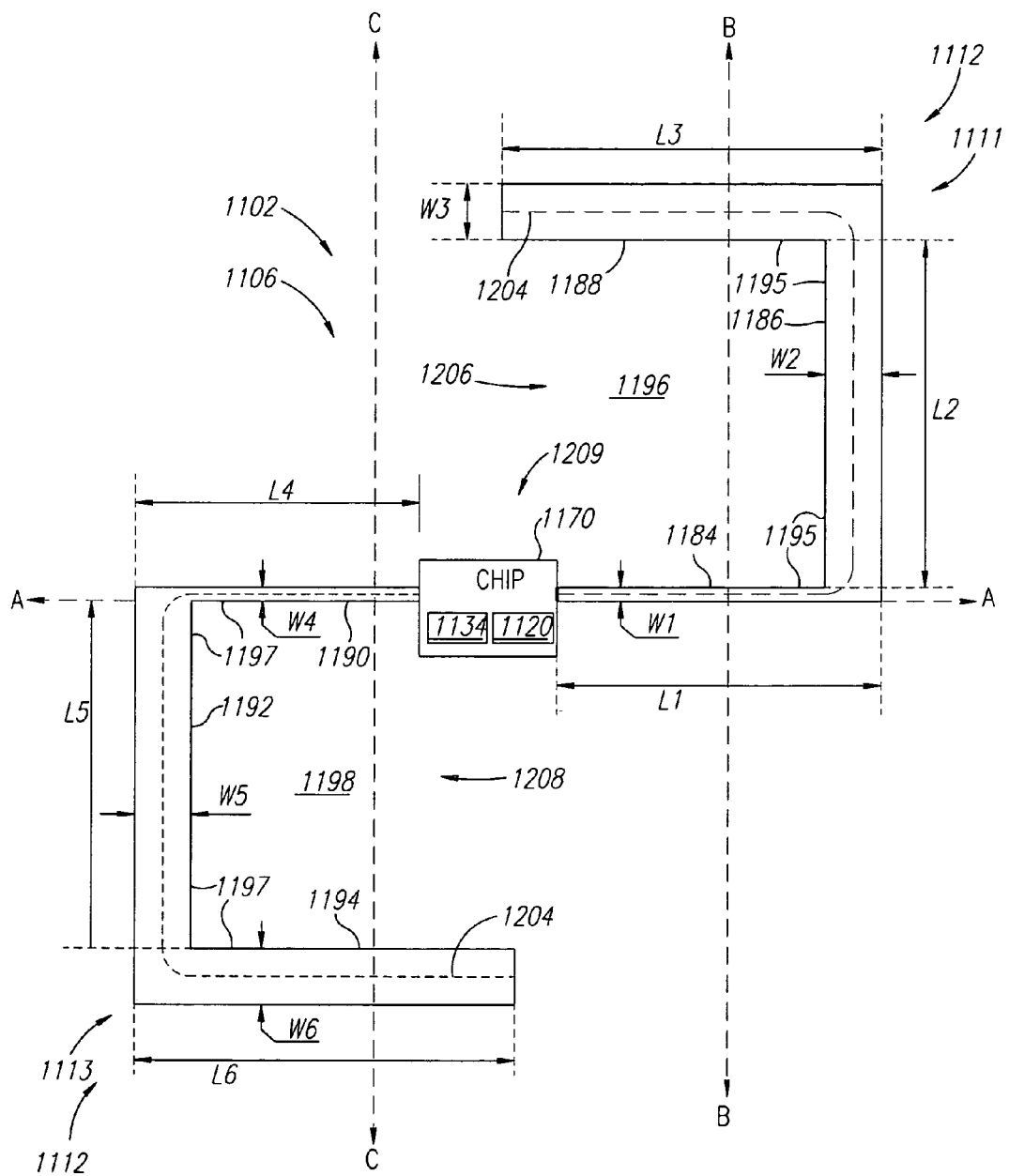
FIG. 11 is a top plan view of an embodiment of an RFID tag.
Figure 12:
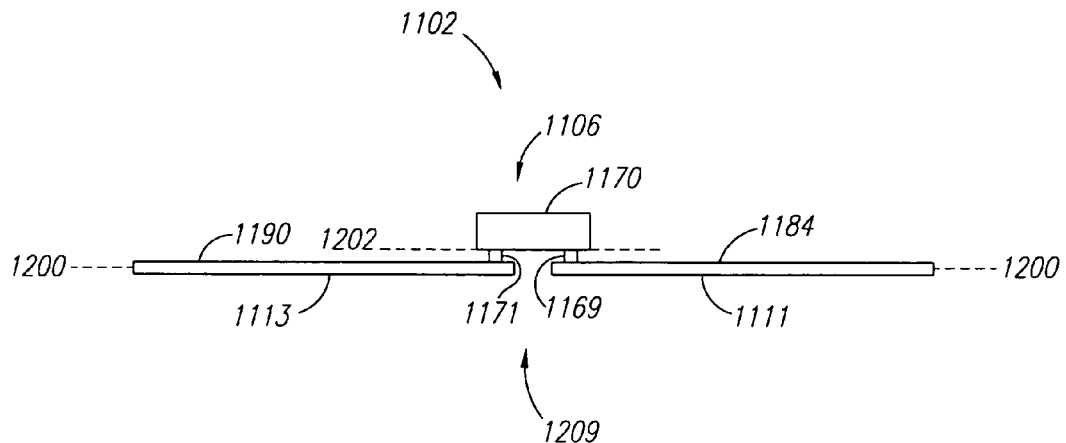
FIG. 12 is a cross-sectional view of the embodiment illustrated in FIG. 11 taken along line A-A.

FIGS. 11 and 12 illustrate an RFID tag 1102 comprising an RFID device 1106. FIG. 11 is a top plan view of the RFID tag 1102. FIG. 12 is a side cross-sectional view of the RFID tag 1102 taken along lines A-A of FIG. 11. The RFID tag 1102 comprises an integrated circuit or chip 1170, and an antenna system 1112 comprising a first arm 1111 electrically coupled to the integrated circuit 1170 at a first node 1169 (see FIG. 12) and a second arm 1113 electrically coupled to the integrated circuit 1170 at a second node 1171 (see FIG. 12). In some embodiments, the first arm 1111 and the second arm 1113 may be separately coupled to the integrated circuit 1170, as illustrated. In some embodiments, the first arm 1111 and the second arm 1113 may be electrically coupled to the integrated circuit 1170 at a common node (not shown). As illustrated, the integrated circuit 1170 comprises a first data system 1120 and a second data system 1134. As illustrated, the antenna system 1112 is generally in a first plane 1200 parallel to a second plane 1202 of the integrated circuit 1170.

The first arm 1111 comprises a first segment 1184, a second segment 1186 and a third or return segment 1188. The first segment 1184 has a width W1 and a length L1, the second segment 1186 has a width W2 and a length L2 and the third segment 1188 has a width W3 and a length L3. The second arm 1113 comprises a first segment 1190, a second segment 1192 and a third or return segment 1194. The first segment 1190 has a width W4 and a length L4, the second segment 1192 has a width W5 and a length L5 and the third segment 1194 has a width W6 and a length L6.

The first segment 1184 of the first arm 1111 and the first segment 1190 of the second arm 1113 extend from the integrated circuit 1170 in generally opposite directions. That is, the first segment 1184 of the first arm 1111 extends from the integrated circuit 1170 in a first direction and the first segment 1190 of the second arm 1113 extends from the integrated circuit 1170 in a second direction opposite from the first direction with respect to the integrated circuit 1170.

Referring now to the first arm 1111, the third segment 1188 is generally parallel to the first segment 1184 and is electrically coupled to the first segment 1184 through the second segment 1186. The second segment 1186 extends from the first segment 1184 in a third direction generally perpendicular to the first direction. The third segment 1188 extends from the second segment 1186 generally in the second direction. The first arm 1111 has an internal perimeter 1195 at least partially surrounding an internal area 1196 on three sides. The first arm 1111 has a C-shape configuration forming a first convex portion 1206 of the antenna system 1112 opening in the second direction.

Referring now to the second arm 1113, the third segment 1194 is generally parallel to the first segment 1190 and is electrically coupled to the first segment 1190 through the second segment 1192. The second segment 1192 extends from the first segment 1190 in a fourth direction generally perpendicular to the second direction and opposite the third direction. The third segment 1194 extends from the second segment 1192 generally in the first direction. The second arm 1113 has an internal perimeter 1197 at least partially surrounding an internal area 1198 on three sides. The second arm 1113 has a C-shaped configuration forming a second convex portion 1208 of the antenna system 1112 opening in the first direction.

Referring now to the antenna system 1112 as a whole, the antenna system has an S-shaped portion 1204 illustrated by a dashed line and formed from the first convex portion 1206 of the first arm 1111 and the second convex portion 1208 of the second arm 1113. The antenna system 1112 is electrically coupled to the integrated circuit 1170 along a central portion 1209 of the S-shaped portion 1204. The first convex portion 1206 opens in the second direction and the second convex portion 1208 opens in the first direction and the antenna system 1112 is coupled to the integrated circuit 1170 between the first convex portion 1206 and the second convex portion 1208 of the S-shaped portion 1204. As illustrated in FIG. 11, the S-shaped portion 1204 is rectilinear. That is, the S-shaped portion 1204 is formed of a plurality of straight segments.

A straight line B-B can be drawn in the plane 1200 of the antenna system 1112 that: intersects the first segment 1184 and the third segment 1188 of the first arm 1111 of the antenna system 1112; does not intersect the second segment 1186 of the first arm 1111; and does not intersect the first segment 1190 of the second arm 1113. A second straight line C-C can be drawn that: intersects the first segment 1190 and the third segment 1194 of the second arm 1113 of the antenna system 1112; does not intersect the second segment 1192 of the second arm 1113; and does not intersect the first segment 1184 of the first arm 1111.

The RFID tag 1102 resonant frequency can be controlled by adjusting the lengths L1-L6 of the segments 1184-1194 of the arms 1111, 1113 of the antenna system 1112. The gain of the antenna system 1112 can be controlled by adjusting the ratio of the length of the first segments 1184, 1190 to the length of the third segments 1188, 1194, and reaches a maximum when:

$$L3=2(L1)=L6=2(L4) \quad \text{(Eq. 1)}$$

The reactance or inductance of the antenna system 1112 can be controlled by adjusting the lengths L1, L4 and widths W1, W4 of the first segments 1184, 1190. Adjusting the lengths L1, L4 and widths W1, W4 of the first segments 1184, 1190 will also impact the gain of the antenna system 1112.

The resistance of the antenna system 1112 can be controlled by adjusting the lengths L2, L5 of the second segments 1186, 1192. The range width of the antenna system 1112 can be controlled by adjusting the widths W2, W3, W5, W6 of the second segments 1186, 1192 and the third segments 1188, 1194. The antenna system 1112 can be tuned by adjusting the lengths L3, L6 of the third segments 1188, 1194 and the widths W2, W5 of the second segments 1186, 1192. For example, the antenna system 1112 can be tuned to a higher frequency by reducing the lengths L3, L6 of the third segments 1188, 1194. In another example, the antenna system 1112 can be tuned to a lower frequency by reducing the widths W2, W5 of the second segments 1186, 1192.

In some embodiments, the first arm 1111 and the second arm 1113 have segments 1184, 1186, 1188, 1190, 1192, 1194 with the same or similar lengths and widths. For example, in some embodiments, $$L1=L4 \quad \text{(Eq. 2)}$$

$$L2=L5 \quad \text{(Eq. 3)}$$

$$L3=L6 \quad \text{(Eq. 4)}$$

$$W1=W4 \quad \text{(Eq. 5)}$$

$$W2=W5 \quad \text{(Eq. 6)}$$

$$W3=W6 \quad \text{(Eq. 7)}.$$

In other embodiments, the arms 1111, 1113 of the antenna system 1112 may not be symmetrical, which facilitates dual-band operation of the RFID tag 1102.

Figure 13:
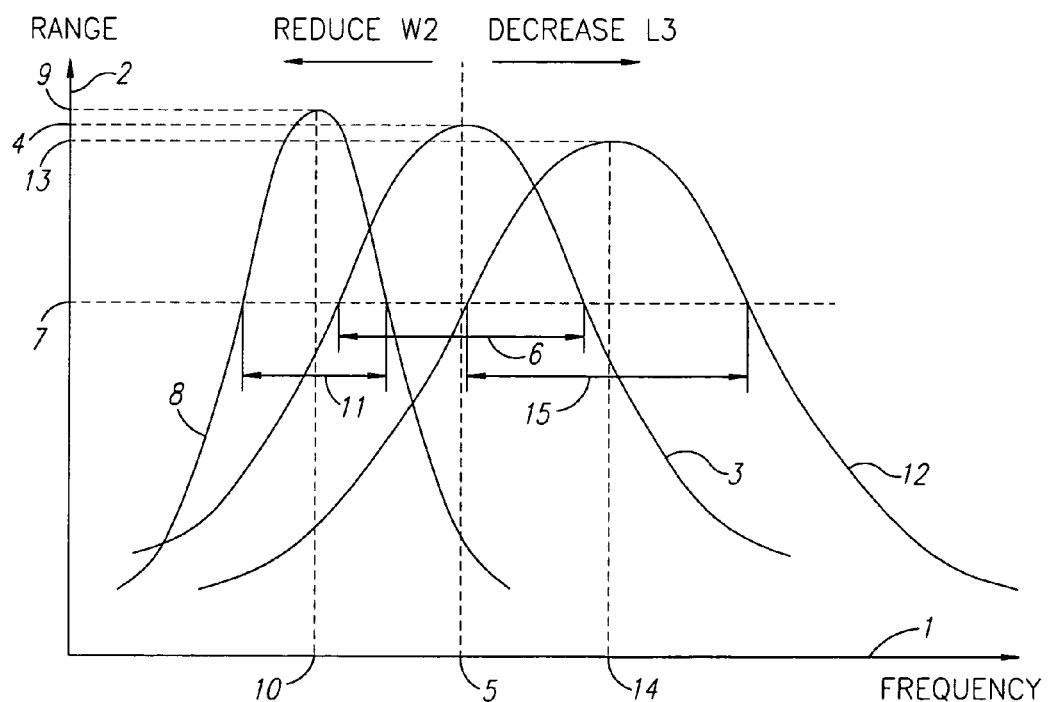
FIG. 13 is a graphical representation of the impact of modifying the antenna arm parameters of the embodiment of an RFID tag device illustrated in FIG. 11 on the performance characteristics of the RFID tag.

FIG. 13 is a graphical representation of the effects of replacing some of the parameters L1-L6 and W1-W6 on the performance characteristics of an RFID tag. Frequency is plotted along the horizontal axis 1. Range is plotted along the vertical axis 2. A first curve 3 represents the range of the RFID tag for a given set of parameter values as a function of frequency. The peak range 4 of the RFID tag occurs at the resonant frequency 5 of the RFID tag. The range width 6 is the frequency bandwidth in which the RFID tag read range is above a threshold minimum 7.

A second curve 8 illustrates the impact of reducing the widths W2, W5 of the second segments 1186, 1192 of the arms 1111, 1113 of the antenna system 1112 illustrated in FIGS. 11 and 12. The peak range 9 is increased. The resonant frequency 10 is decreased and the range width 11 is decreased.

A third curve 12 illustrates the impact of decreasing the lengths L3, L6 of the third segments 1188, 1194 of the arms 1111, 1113 of the antenna system 1112. The peak range 13 is decreased. The resonant frequency 14 is increased and the range width 15 is increased.

Figure 14:
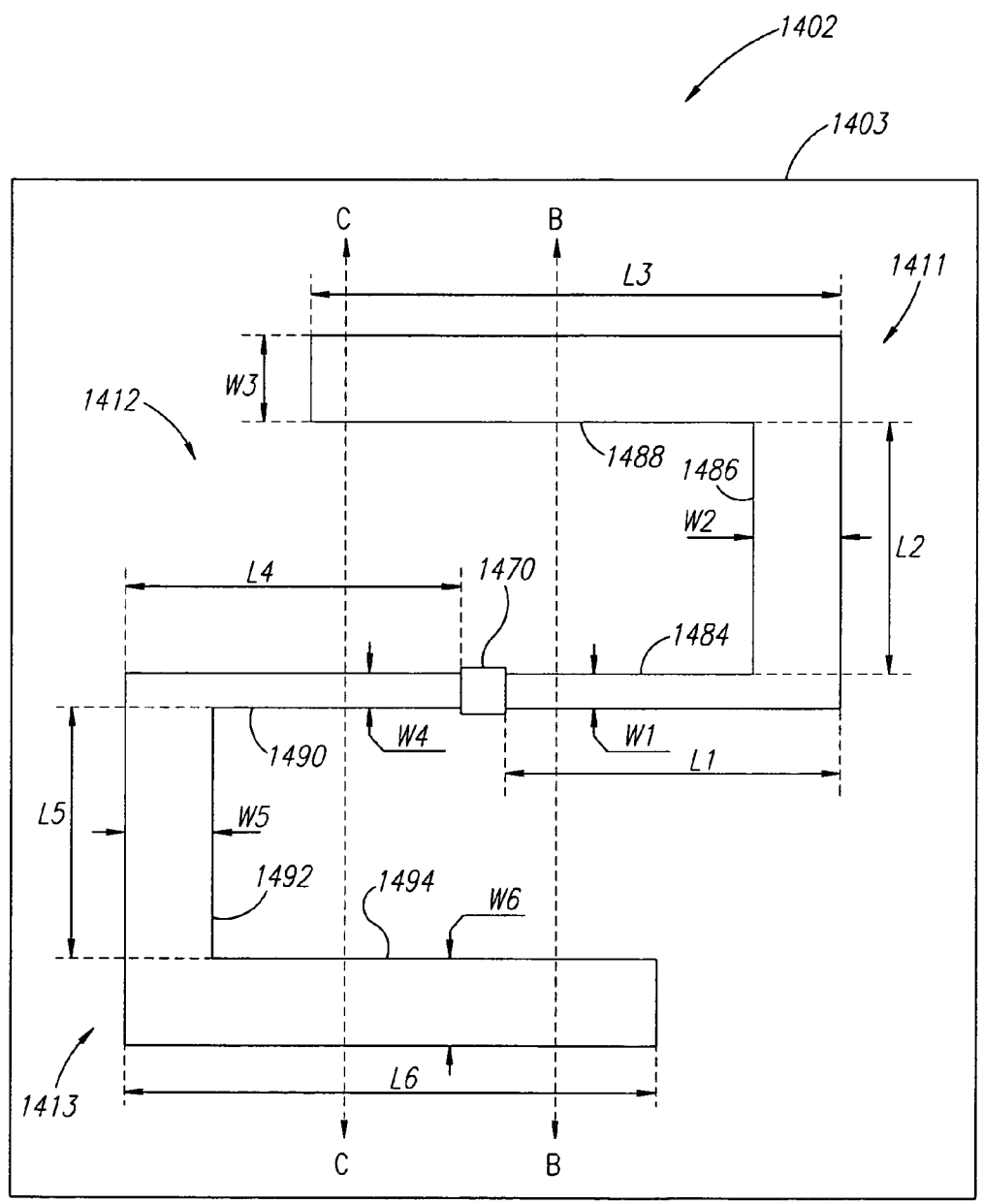
FIG. 14 is a top plan view of an embodiment of an RFID tag.

FIG. 14 is a top plan view of an embodiment of an RFID tag 1402. Measurements were taken with an embodiment as illustrated in FIG. 14 constructed using a single-sided, 2 mil. polyester substrate 1403, a Philips G2 RFID integrated circuit 1470 and flip-chip packaging, with, $$L1=L4=40\text{mm} \quad \text{(Eq. 8)}$$

$$L2=L5=30\text{mm} \quad \text{(Eq. 9)}$$

$$L3=L6=55\text{mm} \quad \text{(Eq. 10)}$$

$$W1=W4=3\text{mm} \quad \text{(Eq. 11)}$$

$$W2=W5=10\text{mm} \quad \text{(Eq. 12)}$$

$$W3=W6=10\text{mm} \quad \text{(Eq. 13)}.$$

A silver ink trace (using ink sold by DuPont under the trade designation 5025) was printed on the substrate 1403 to form the arms 1411, 1413 of the antenna system 1412. The antenna system 1412 has approximate dimensions of 80 mm by 83 mm. Performance of the embodiment of FIG. 14 was measured with the embodiment placed inside a label (not shown) and affixed to a cardboard box (not shown). This represents a typical application of an RFID tag in a conventional shipping label. The embodiment was found to have a sixteen-foot peak range at a resonant frequency of 910 MHz and a range width from 860 to 960 MHz for a ten-foot-minimum range when measured normal to a plane (see plane 1200 of FIG. 12) of the antenna system 1412.

A straight line B-B can be drawn which: intersects the first segment 1484 and the third segment 1488 of the first arm 1411 and the third segment 1494 of the second arm 1413 of the antenna system 1412; does not intersect the second segment 1486 of the first arm 1411; and does not intersect the first segment 1490 of the second arm 1413. A second straight line C-C can be drawn which: intersects the first segment 1490 and the third segment 1494 of the second arm 1413 and the third segment 1488 of the first arm 1411 of the antenna system 1412; does not intersect the second segment 1492 of the second arm 1413; and does not intersect the first segment 1484 of the first arm 1411.

Figure 15:
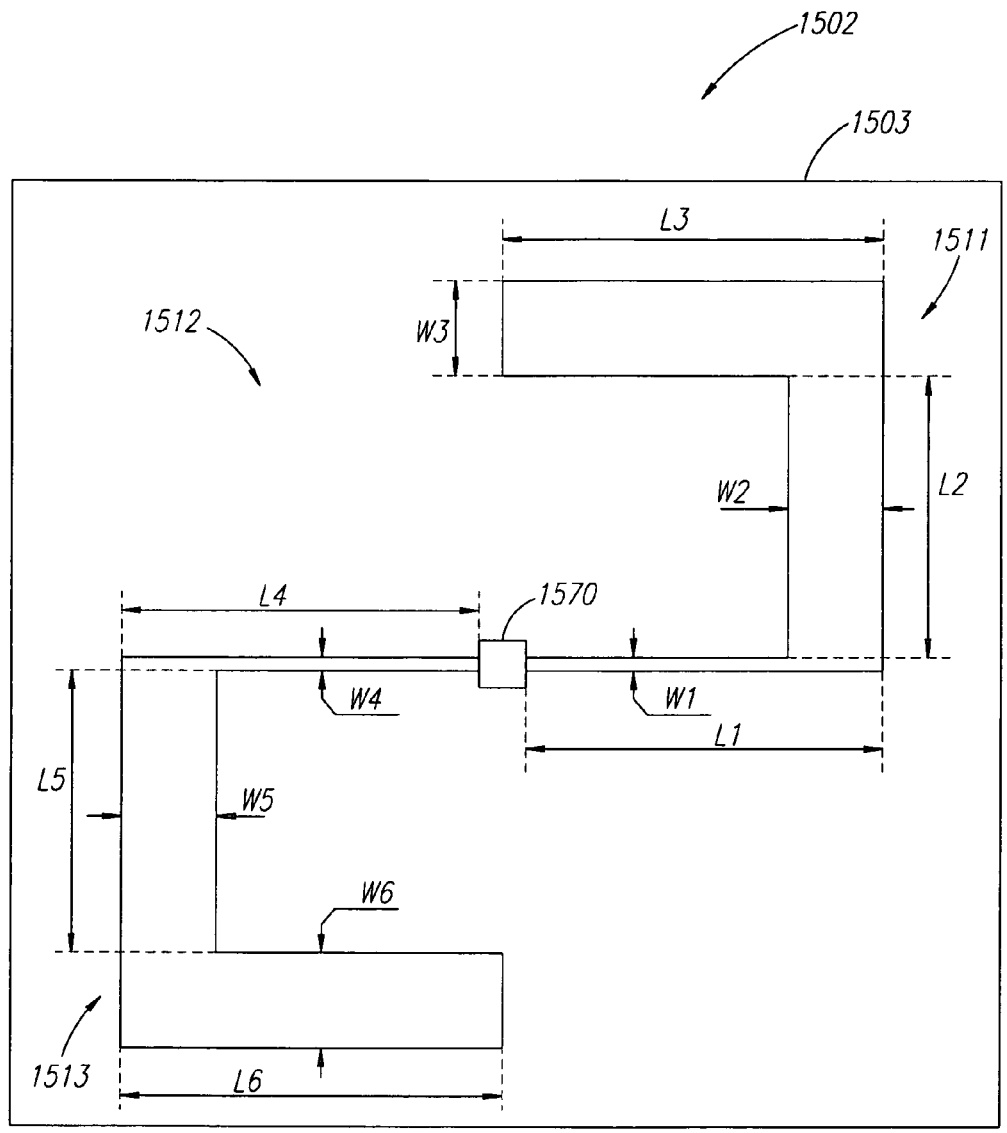
FIG. 15 is a top plan view of an embodiment of an RFID tag.

FIG. 15 is a top plan view of an embodiment of an RFID tag 1502. Measurements were taken with an embodiment as illustrated in FIG. 15 constructed using a single-sided, 2 mil. polyester substrate 1503, a Philips G2 RFID integrated circuit 1570 and flip-chip packaging, with, $$L1=L4=40\text{mm} \quad \text{(Eq. 14)}$$

$$L2=L5=30\text{mm} \quad \text{(Eq. 15)}$$

$$L3=L6=40\text{mm} \quad \text{(Eq. 16)}$$

$$W1=W4=0.5\text{mm} \tag{Eq. 17}$$

$$W2=W5=10\text{mm} \tag{Eq. 18}$$

$$W3=W6=10\text{mm} \tag{Eq. 19}$$

One ounce copper trace material was printed on the substrate 1503 to form the arms 1511, 1513 of the antenna system 1512. The antenna system 1512 of the illustrated embodiment has approximate dimensions of 80 mm by 80 mm. Performance of the embodiment of FIG. 15 was measured with the embodiment placed inside a label (not shown) and affixed to a cardboard box (not shown). This represents a typical application of an RFID tag in a conventional shipping label. The embodiment was found to have an eighteen-foot peak range at a resonant frequency of 910 MHz and a range width from 860 to 960 MHz for a twelve-foot minimum range when measured normal to a plane (see plane 1200 of FIG. 12) of the antenna system 1512.

Figure 16:
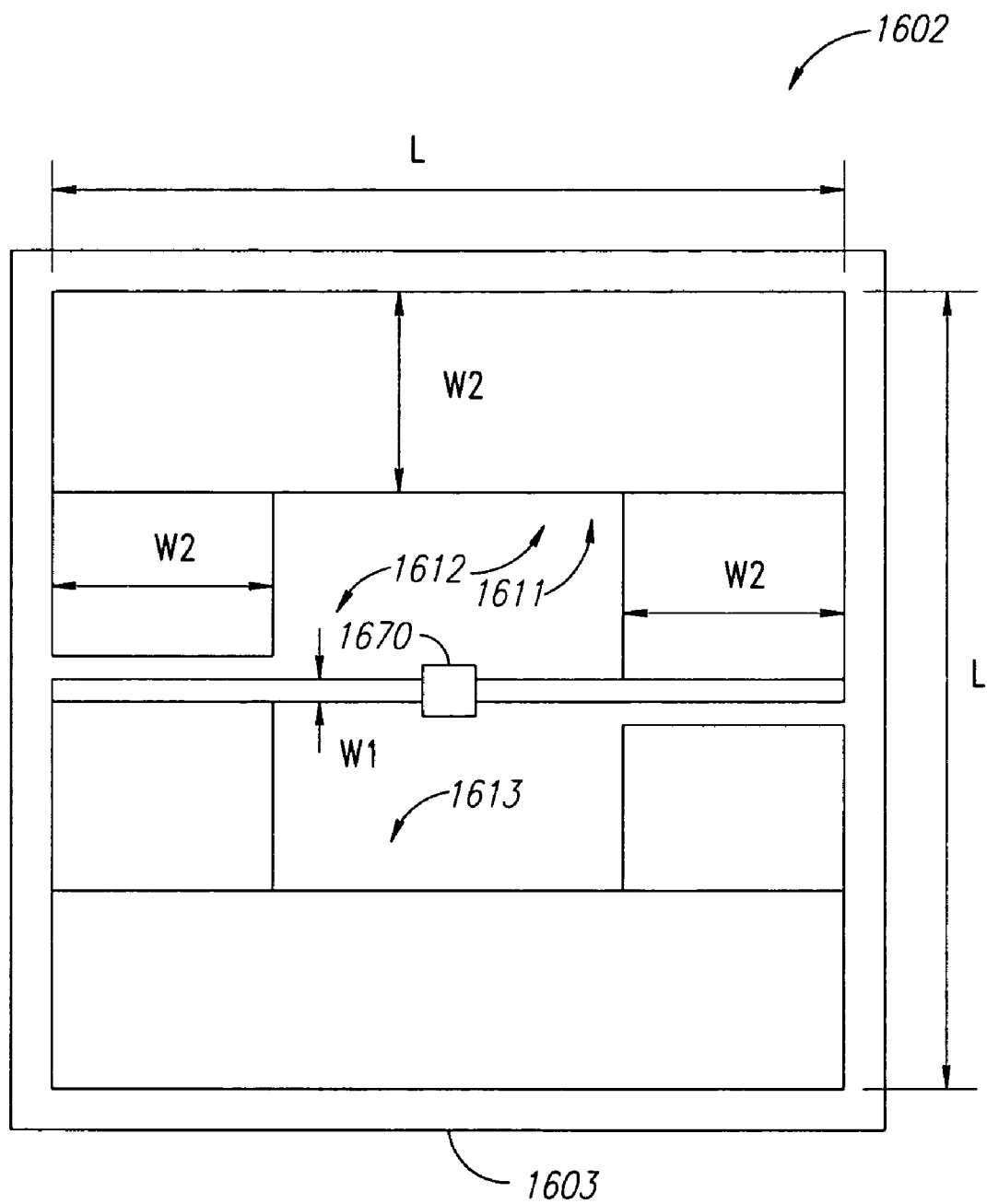
FIG. 16 is a top plan view of an embodiment of an RFID tag.

FIG. 16 is a top plan view of an embodiment of an RFID tag 1602. Measurements were taken with an embodiment as illustrated in FIG. 16 constructed using a single-sided, 2 mil. polyester substrate 1603, a Philips G2 RFID integrated circuit 1670 and flip-chip packaging, with, $$L=96\text{mm} \tag{Eq. 20}$$

$$W1=0.5\text{mm} \tag{Eq. 21}$$

$$W2=28\text{mm} \tag{Eq. 22}$$

One ounce copper trace material was printed on the substrate 1603 to form the arms 1611, 1613 of the antenna system 1612. Performance of the embodiment of FIG. 16 was measured with the embodiment placed inside a label (not shown) and affixed to a cardboard box (not shown). This represents a typical application of an RFID tag in a conventional shipping label. The embodiment was found to have a twenty one-foot peak range at a resonant frequency of 910 MHz and a range width from 860 to 960 MHz for a fifteen-foot minimum range when measured normal to a plane (see plane 1200 of FIG. 12) of the antenna system 1612.

Figure 17:
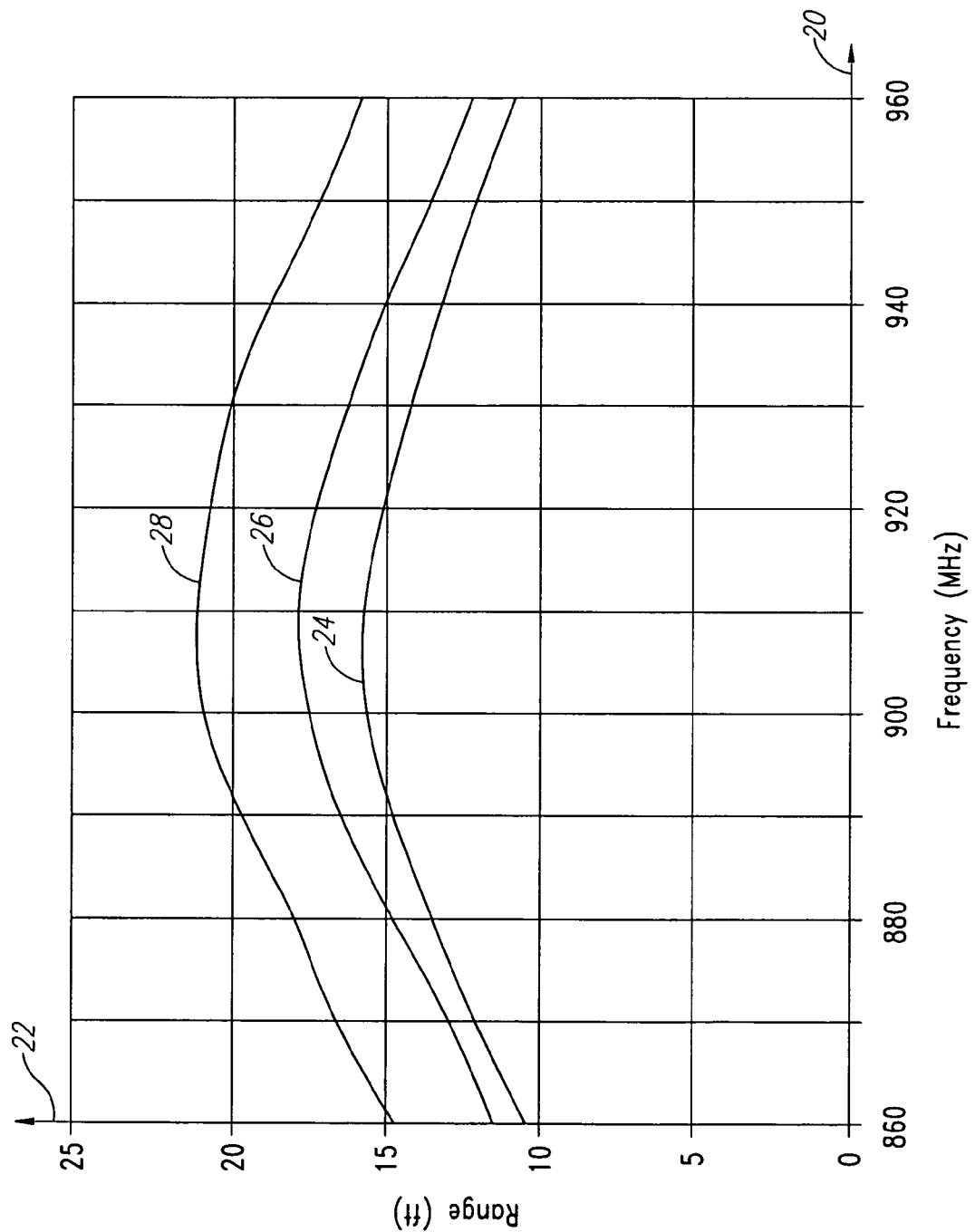
FIG. 17 is a graphical representation of the tag range as a function of frequency for the embodiments of FIGS. 14, 15 and 16.

FIG. 17 is a graphical representation of experimentally measured tag range as a function of frequency for the embodiments illustrated in FIGS. 14-16. The same resonant frequency of 910 MHz is obtained by adjusting the parameters of the antenna system (i.e., by adjusting L1-L6 and/or W1-W6 of the embodiment illustrated in FIG. 14). The measurements were taken by placing the embodiments in a label (not shown) and affixing the label to a cardboard box (not shown), which represents a typical application for an RFID tag. Similar measurements for an RFID tag in a different application (for example, if placed in a label and affixed to a different material) would show some variability in the resonant frequency and range measurements. The parameters of the antenna system can be adjusted to achieve the desired RFID tag resonant frequency and range.

Frequency is plotted along the horizontal axis 20. Range is plotted along the vertical axis 22. A first curve 24 illustrates the range as a function of frequency of the embodiment of an RFID tag 1402 illustrated in FIG. 14, which has an S-shaped antenna system printed with silver-ink, under the test conditions. A second curve 26 illustrates the range as a function of frequency of the embodiment of an RFID tag 1502 illustrated in FIG. 15, which can be generally described as having an S-shaped antenna system printed with copper traces of a medium width, under the test conditions. A third curve 28 illustrates the range as a function of frequency of the embodiment of an RFID tag 1602 illustrated in FIG. 16, which can be generally described as having an S-shaped antenna system printed with copper traces of a large width, under the test conditions.

Table 1, set forth below, contains data gathered during testing of the embodiments of FIGS. 14, 15 and 16. The first column of Table 1 sets forth the frequency in MHz. The remaining columns of Table 1 set forth the range in feet for the corresponding embodiment.

TABLE 1

| Frequency | FIG. 14 | FIG. 15 | FIG. 16 |
|---|---|---|---|
| 860 | 10.5 | 11.5 | 14.9 |
| 870 | 12.2 | 12.8 | 16.6 |
| 880 | 13.5 | 14.8 | 18 |
| 890 | 14.8 | 16.5 | 19.7 |
| 900 | 15.8 | 17.7 | 21 |
| 910 | 15.9 | 18 | 21.2 |
| 920 | 15.1 | 17.3 | 20.6 |
| 930 | 14.2 | 16.3 | 20 |
| 940 | 13.3 | 15.1 | 18.8 |
| 950 | 12.2 | 13.5 | 17 |
| 960 | 10.9 | 12.3 | 15.8 |

Figure 18:
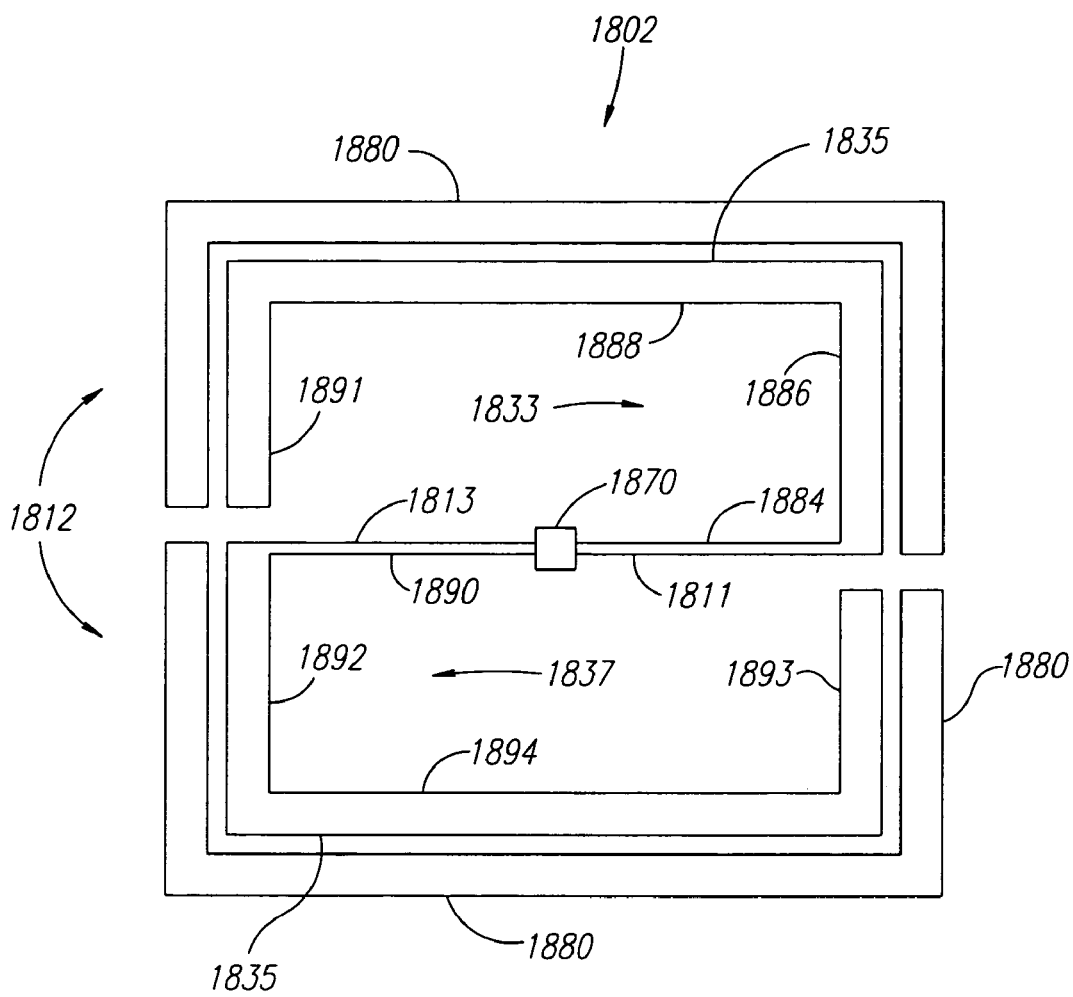
FIG. 18 is a top plan view of an embodiment of an RFID tag.

FIG. 18 is a top plan view of an embodiment of an RFID tag 1802 comprising an integrated circuit 1870 electrically coupled to an antenna system 1812 comprising a first arm 1811, a second arm 1813 and two parasitic elements 1880 placed outside second segments 1886, 1892, third segments 1888, 1894 and fourth segments 1891, 1893 of the respective first and second arms 1811, 1813. The first, second and third segments 1884, 1886, 1888 of the first arm 1811 form a first convex portion 1833. The first, second and third segments 1890, 1892, 1894 of the second arm 1813 form a second convex portion 1837. The first and second convex portions 1833, 1837 form an S-shaped portion 1835 of the antenna system 1812.

Figure 19:
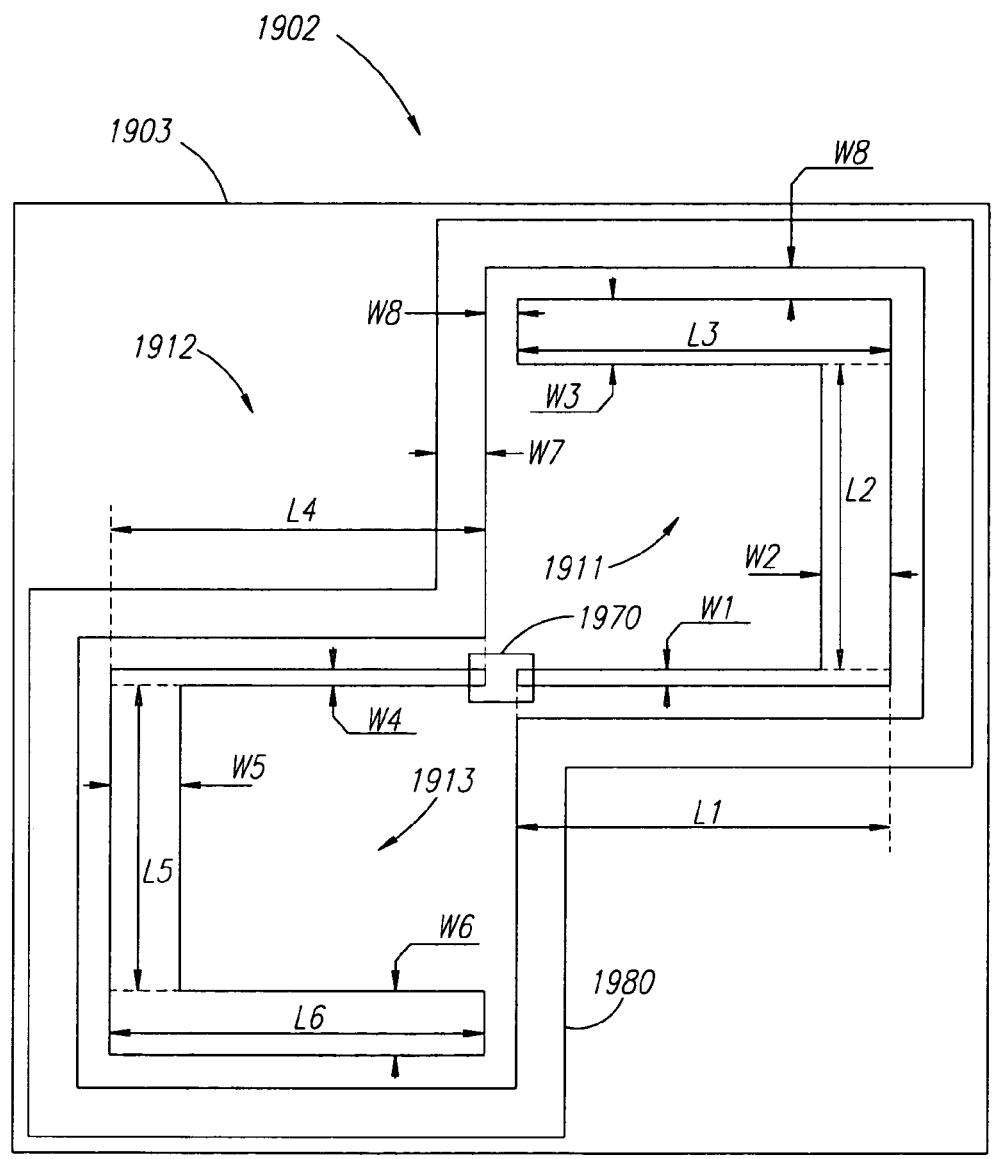
FIG. 19 is a top plan view of an embodiment of an RFID tag.

FIG. 19 is a top plan view of an embodiment of an RFID tag 1902. Measurements were taken with an embodiment as illustrated in FIG. 19 constructed using a single-sided, 2 mil. polyester substrate 1903, a Philips G2 RFID integrated circuit 1970 and flip-chip packaging, wherein, $$L1=L4=40\text{mm} \tag{Eq. 23}$$

$$L2=L5=30\text{mm} \tag{Eq. 24}$$

$$L3=L6=40\text{mm} \tag{Eq. 25}$$

$$W1=W4=0.5\text{mm} \tag{Eq. 26}$$

$$W2=W5=10\text{mm} \tag{Eq. 27}$$

$$W3=W6=10\text{mm} \tag{Eq. 28}$$

One ounce copper trace material was printed on the substrate 1903 to form the arms 1911, 1913 of the antenna system 1912. A parasitic ring element 1980 printed on the substrate 1903 with one ounce copper trace material surrounds the arms 1911, 1913 of the antenna system 1912. The parasitic ring element 1980 has a thickness W7 of 5 mm and is separated from the arms 1911, 1913 by a distance W8 of 1 mm. The antenna system 1912 has approximate dimensions of 92 mm by 92 mm. Performance of the embodiment of FIG. 19 was measured in free space normal to a plane (See Figure plane 1200 of FIG. 12) of the antenna system 1912. The embodiment was found to have a twenty-eight foot peak range at a resonant frequency of 880 MHz. Performance of the embodiment was also measured with the embodiment placed in a label (not shown) affixed to a cardboard box (not shown). The embodiment was found to have a twenty-three foot peak range at a resonant frequency of 830 MHz when measured normal to a plane (see plane 1200 of FIG. 12) of the antenna system 1912. The embodiment of FIG. 19 for which measurements were taken is identical to the embodiment of FIG. 15 for which measurements were taken, except for the addition of the parasitic ring element 1980. The addition of the parasitic ring element 1980 creates a more resonant RFID tag and increases the antenna gain of the RFID tag 1902 in the normal to a plane (see plane 1200 of FIG. 12) of the antenna system 1912.

Figure 20:
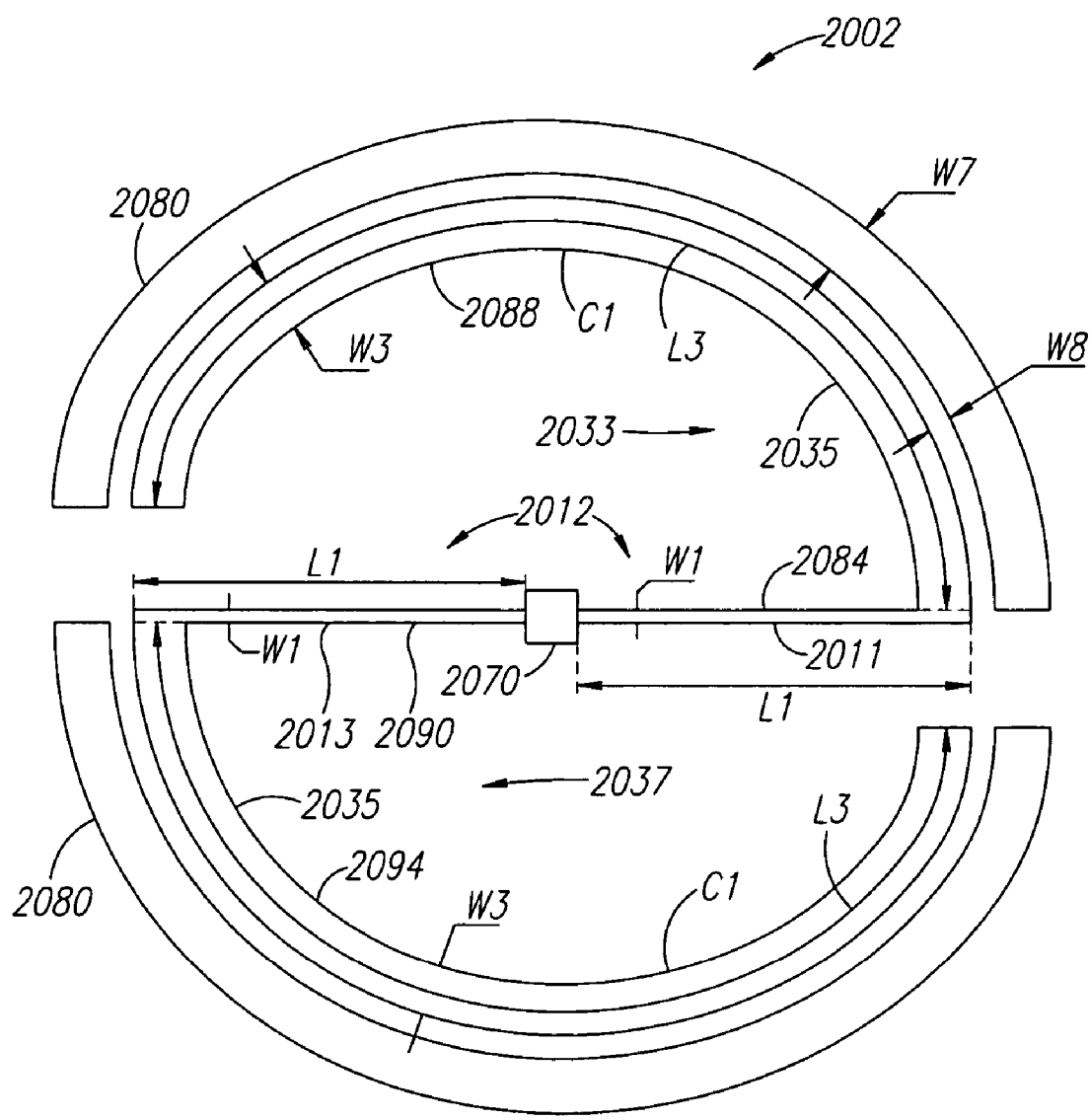
FIG. 20 is a top plan view of an embodiment of an RFID tag.

FIG. 20 is a top plan view of an embodiment of an RFID tag 2002 comprising an integrated circuit 2070 electrically coupled to an antenna system 2012. The antenna system 2012 comprises a first arm 2011 and a second arm 2013.

Referring now to the first arm 2011, a first segment 2084 is electrically coupled to and extends generally in a first direction from the integrated circuit 2070. The first segment 2084 has a width W1 and a length L1. The first segment 2084 is electrically coupled to a curved return segment 2088. The curved return segment 2088 extends from the first segment 2084 in a second direction generally upward and opposite from the first direction. The curved return segment 2088 has a width W3, a length L3 and a curvature C1. Together, the first segment 2084 and the return segment 2088 form a first convex portion 2033 of the antenna system 2012.

Referring now to the second arm 2013, a first segment 2090 is electrically coupled to and extends from the integrated circuit 2070 in a third direction generally opposite from the first direction. The first segment 2090 has a width W1 and a length L1. The first segment 2090 is electrically coupled to a curved return segment 2094. The curved return segment 2094 extends from the first segment 2090 in a third direction generally downward from the first segment 2090 and in the first direction. The curved return segment 2094 has a width W3, a length L3 and a curvature C1. Together, the first segment 2090 and the curved return segment 2094 form a second convex portion 2037 of the antenna system 2012.

Referring now to the antenna system as a whole, the first convex portion 2033 and the second convex portion 2037 together form an S-shaped portion 2035 of the antenna system 2012. The S-shaped portion 2035 is electrically coupled to the integrated circuit 2070 between the first convex portion 2033 and the second convex portion 2037.

Optional parasitic elements 2080 are positioned outside the curved return segments 2088, 2094 of the first and second arms 2011, 2013 of the antenna system 2012. The parasitic elements have a width W7 and are separated from the curved return segments 2088, 2094 of the antenna system 2012 by a distance W8.

Figure 21:
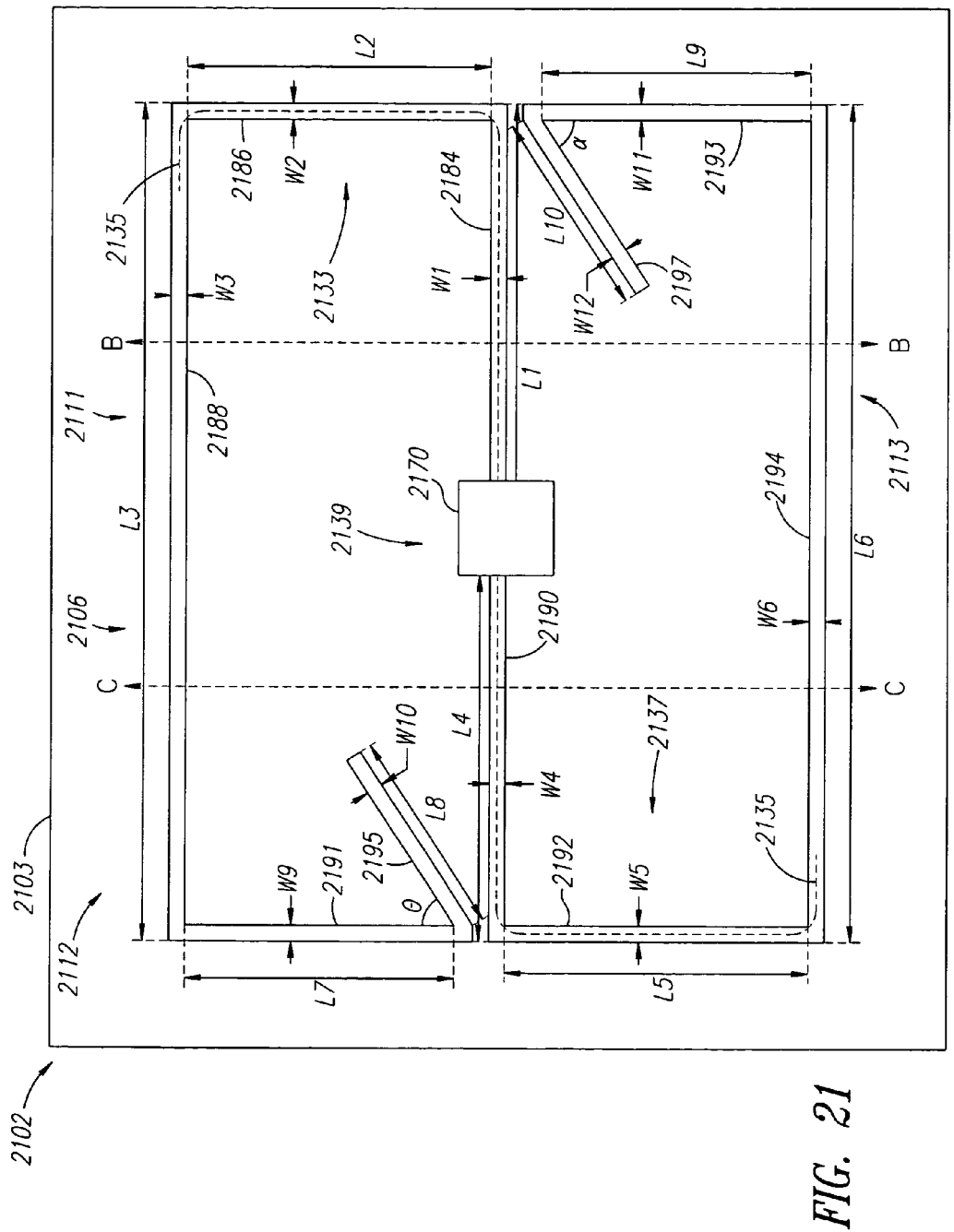
FIG. 21 is a top plan view of an embodiment of an RFID tag.

FIG. 21 is a top plane view of an embodiment of an RFID tag 2102 comprising an RFID device 2106. The RFID device 2106 comprises an integrated circuit 2170, and an antenna system 2112 comprising a first arm 2111 electrically coupled to the integrated circuit 2170 and a second arm 2113 electrically coupled to the integrated circuit 2170.

The first arm 2111 comprises a first segment 2184, a second segment 2186, a third segment 2188, a fourth segment 2191 and a fifth segment 2195. The first segment 2184 has a width W1 and a length L1, the second segment 2186 has a width W2 and a length L2, the third segment 2188 has a width W3 and a length L3, the fourth segment 2191 has a width W9 and a length L7, the fifth segment 2195 has a width W10 and a length L8. The second arm 2113 comprises a first segment 2190, a second segment 2192, a third segment 2194, a fourth segment 2193 and a fifth segment 2197. The first segment 2190 has a width W4 and a length L4, the second segment 2192 has a width W5 and a length L5, the third segment 2194 has a width W6 and a length L6, the fourth segment 2193 has a width W11 and a length L9 and the fifth segment 2197 has a width W12 and a length L10.

The first segment 2184 of the first arm 2111 and the first segment 2190 of the second arm 2113 extend from the integrated circuit 2170 in generally opposite directions. That is, the first segment 2184 of the first arm 2111 extends from the integrated circuit 2170 in a first direction and the first segment 2190 of the second arm 2113 extends from the integrated circuit 2170 in a second direction opposite from the first direction with respect to the integrated circuit 2170.

Referring now to the first arm 2111, the third segment 2188 is generally parallel to the first segment 2184 and is electrically coupled to the first segment 2184 through the second segment 2186. The second segment 2186 extends from the first segment 2184 in a third direction generally perpendicular to the first direction. The third segment 2188 extends from the second segment 2186 generally in the second direction. The fourth segment 2191 is electrically coupled to the third segment 2188 and extends from the third segment 2188 in a fourth direction generally perpendicular to the second direction and opposite of the third direction. The fifth segment 2195 is electrically coupled to the fourth segment 2191 and extends from the fourth segment in a fifth direction at an angle θ with respect to the fourth segment 2191 between zero and 90 degrees. Thus, the first three segments 2184, 2186, 2188 of the first arm 2111 have a C-shaped configuration forming a first convex portion 2133 of the antenna system 2112 opening in the second direction.

Referring now to the second arm 2113, the third segment 2194 is generally parallel to the first segment 2190 and is electrically coupled to the first segment 2190 through the second segment 2192. The second segment 2192 extends from the first segment 2190 in the fourth direction generally perpendicular to the second direction and opposite the third direction. The third segment 2194 extends from the second segment 2192 generally in the first direction. The fourth segment 2193 is electrically coupled to the third segment 2194 and extends from the third segment 2194 in the third direction. The fifth segment 2197 is electrically coupled to the fourth segment 2193 and extends from the fourth segment 2193 in a sixth direction at an angle α with respect to the fourth segment 2193 of between zero and 90 degrees. Thus, the first three segments 2190, 2192, 2194 of the second arm 2113 have a C-shaped configuration forming a second convex portion 2137 of the antenna system 2112 opening in the first direction.

Referring now to the antenna system 2112 as a whole, the antenna system has an S-shaped configuration or portion 2135 formed from the first convex portion 2133 of the first arm 2111 and the second convex portion 2137 of the second arm 2113. The antenna system 2112 is electrically coupled to the integrated circuit 2170 along a central portion 2139 of the S-shaped portion 2135. As illustrated in FIG. 21, the S-shaped portion 2135 is rectilinear. In other words, the S-shaped portion 2135 is comprised of straight segments coupled together at various angles.

A straight line B-B can be drawn which: intersects the first segment 2184 and the third segment 2188 of the first arm 2111 of the antenna system 2112; does not intersect the second segment 2186 of the first arm 2111; and does not intersect the first segment 2190 of the second arm 2113. A second straight line C-C can be drawn which: intersects the first segment 2190 and the third segment 2194 of the second arm 2113 of the antenna system 2112; does not intersect the second segment 2192 of the second arm 2113; and does not intersect the first segment 2184 of the first arm 2111.

Performance of an embodiment as illustrated in FIG. 21 was measured for a single-sided, 2 mil. polyester substrate 2103, a Philips G2 RFID integrated circuit or chip 2170 and flip-chip packaging with a one-ounce copper antenna trace printed on the polyester substrate 2103, and wherein, $$L1=L4=24mm \quad (Eq. 29)$$

$$L2=L5=L7=L9=22mm \quad (Eq. 30)$$

$$L3=L6=48mm \quad (Eq. 31)$$

$$W1=W2=W3=W4=W5=W6=1mm \quad (Eq. 32)$$

$$W9=W10=W11=W12=1mm \quad (Eq. 33).$$

The embodiment was placed in a label (not shown) and affixed to cardboard (not shown). An 18-foot peak range was obtained at a resonant frequency of 915 MHz and a range width from 890 to 950 MHz for an eleven-foot minimum range when measured normal to a plane (see plane 1200 of FIG. 12) of the antenna system 2112. The antenna system 2112 has dimensions of 48 mm by 48 mm, which provides a compact, S-shaped antenna.

Figure 22:
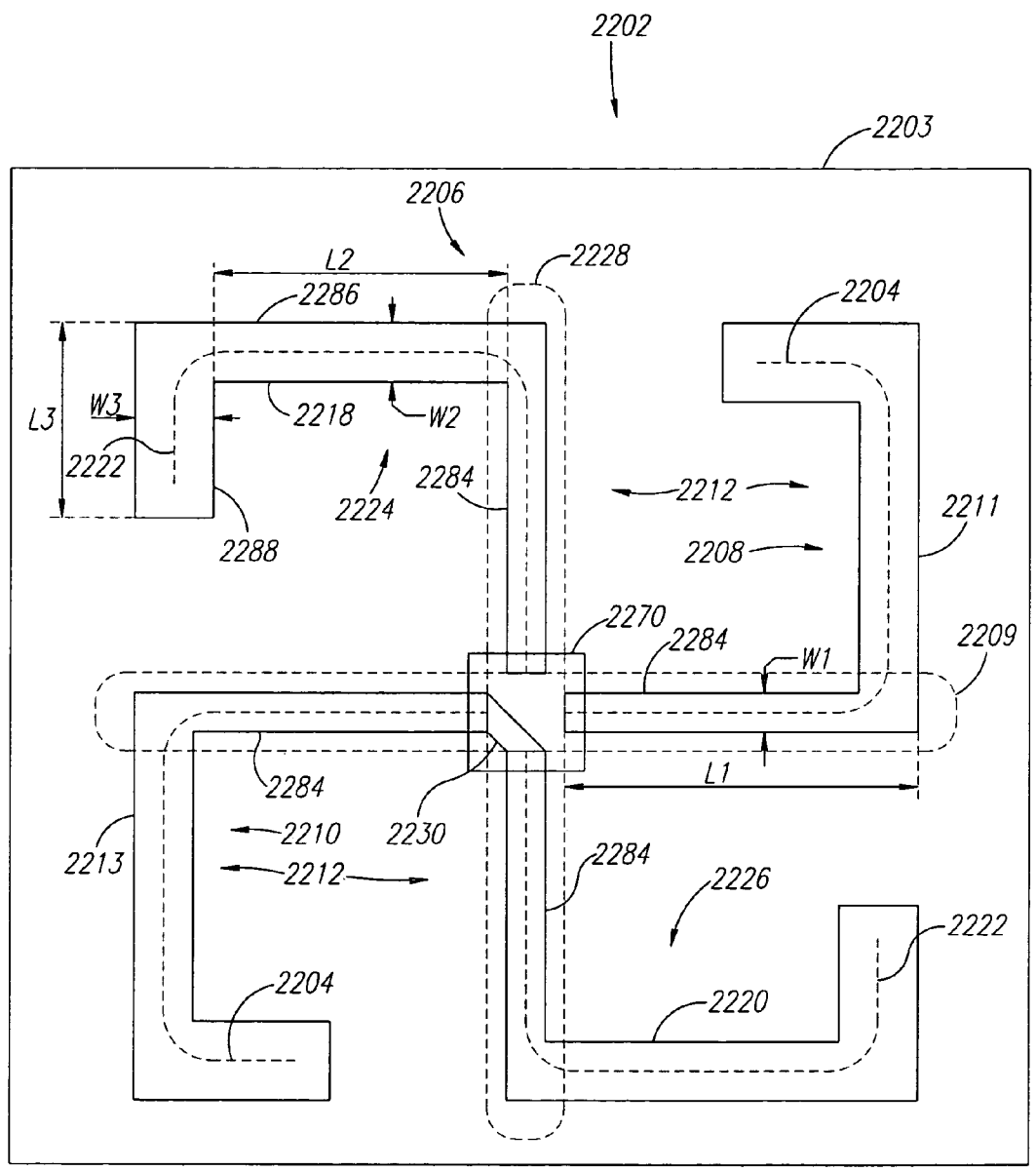
FIG. 22 is a top plan view of an embodiment of an RFID tag.

FIG. 22 is a top plan view of an RFID tag 2202 comprising a dual-input RFID device 2206 comprising an antenna system 2212 electrically coupled to an integrated circuit 2270. The antenna system 2212 comprises four arms 2211, 2213, 2218, 2220. As illustrated, each arm 2211, 2213, 2218, 2220 comprises a first segment 2284 having a width W1 and a length L1, a second segment 2286 having a width W2 and a length L2, and a third segment 2288 having a width W3 and a length L3. The first arm 2211 and the second arm 2213 together form an S-shaped portion 2204 formed from a first convex portion 2208 and a second convex portion 2210. The first arm 2211 and the second arm 2213 are electrically coupled to the integrated circuit 2270 separately and along a central portion 2209 of the S-shaped portion 2204. The first convex portion 2208 opens in a first direction and the second convex portion 2210 opens in a second direction opposite the first direction.

The third arm 2218 and the fourth arm 2220 together form a second S-shaped portion 2222 formed from a third convex portion 2224 and a fourth convex portion 2226 of the antenna system 2212. The third arm 2218 and the fourth arm 2220 are electrically coupled to the integrated circuit 2270 separately and along a central portion 2228 of the second S-shaped portion 2222. The second arm 2213 and the fourth arm 2220 are electrically coupled to a common node 2230 of the integrated circuit 2270. The third convex portion 2224 opens in a third direction and the fourth convex portion 2226 opens in a fourth direction opposite the third direction. The second S-shaped portion 2222 is rotated ninety degrees with respect to the first S-shaped portion 2204 in a plane of the antenna system 2212 (see plane 1200 in FIG. 12). The segments 2284, 2286, 2288 of the arms 2211, 2213, 2218, 2220 may have different widths W1, W2, W3 and lengths L1, L2, L3.

In one embodiment, the RFID tag 2202 illustrated in FIG. 22 may be constructed using a single-sided, 2 mil. polyester substrate 2203 and flip-chip packaging with one-ounce copper trace material printed on the substrate 2203 to form the arms 2211, 2213, 2218, 2220 of the antenna system. Based on the measurements conducted on the embodiment illustrated in FIG. 15, if the following parameters are employed, $$L1=L3=40mm \quad (Eq. 34)$$

$$L2=30mm \quad (Eq. 35)$$

$$W1=0.5mm \quad (Eq. 36)$$

$$W2=W3=10mm \quad (Eq. 37),$$

the embodiment illustrated in FIG. 22 has a theoretical peak range of 38 feet at a resonant frequency of 915 MHz with improved omni-directionality over the embodiment illustrated in FIG. 15 and with dimensions of approximately 80 mm by 80 mm.

Figure 23:
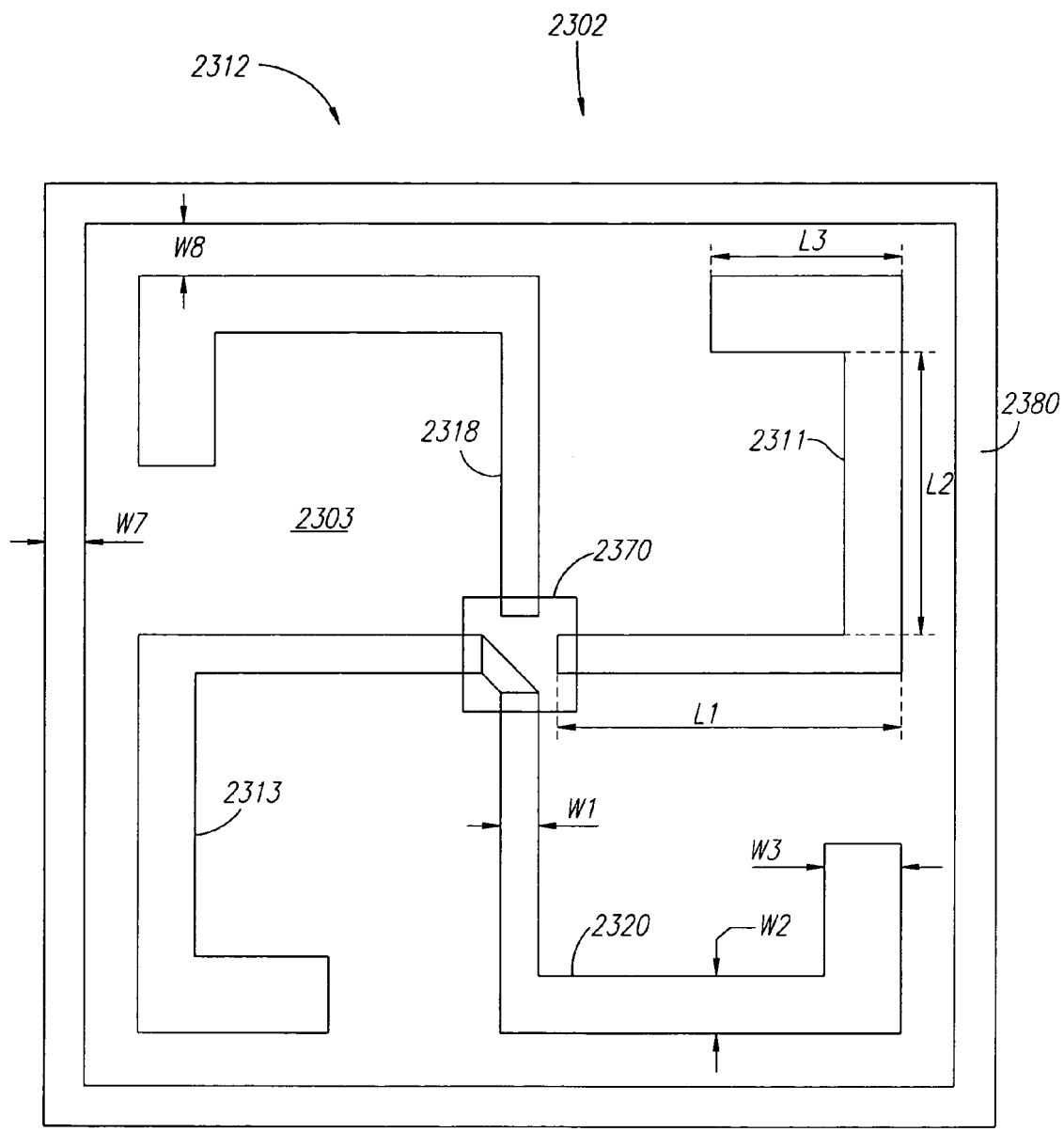
FIG. 23 is a top plan view of an embodiment of an RFID tag.

FIG. 23 is a top plan view of an embodiment of an RFID tag 2302 as illustrated in FIG. 22 with an optional parasitic loop 2380 printed on the substrate 2303 around the four arms 2311, 2313, 2318, 2320 of the antenna system 2312. The four arms 2311, 2313, 2318, 2320 of the antenna system 2312 are coupled to an integrated circuit 2370. An embodiment may be constructed using a single-sided, 2 mil. polyester substrate 2303 and flip-chip packaging with one-ounce copper trace material printed on the substrate 2303 to form the arms 2311, 2313, 2318, 2320 of the antenna system. Based on the measurements conducted on the embodiment illustrated in FIG. 15, if the following parameters are employed, $$L1=L3=40mm \quad (Eq. 38)$$

$$L2=30mm \quad (Eq. 39)$$

$$W1=0.5mm \quad (Eq. 40)$$

$$W2=W3=10mm \quad (Eq. 41)$$

$$W7=5mm \quad (Eq. 42)$$

$$W8=1mm \quad (Eq. 43),$$

the embodiment illustrated in FIG. 23 has a theoretical peak range of greater than 40 feet at a resonant frequency of 915 MHz with improved omni-directionality over the embodiment illustrated in FIG. 15 and with dimensions of approximately 102 mm by 102 mm.

Figure 24:
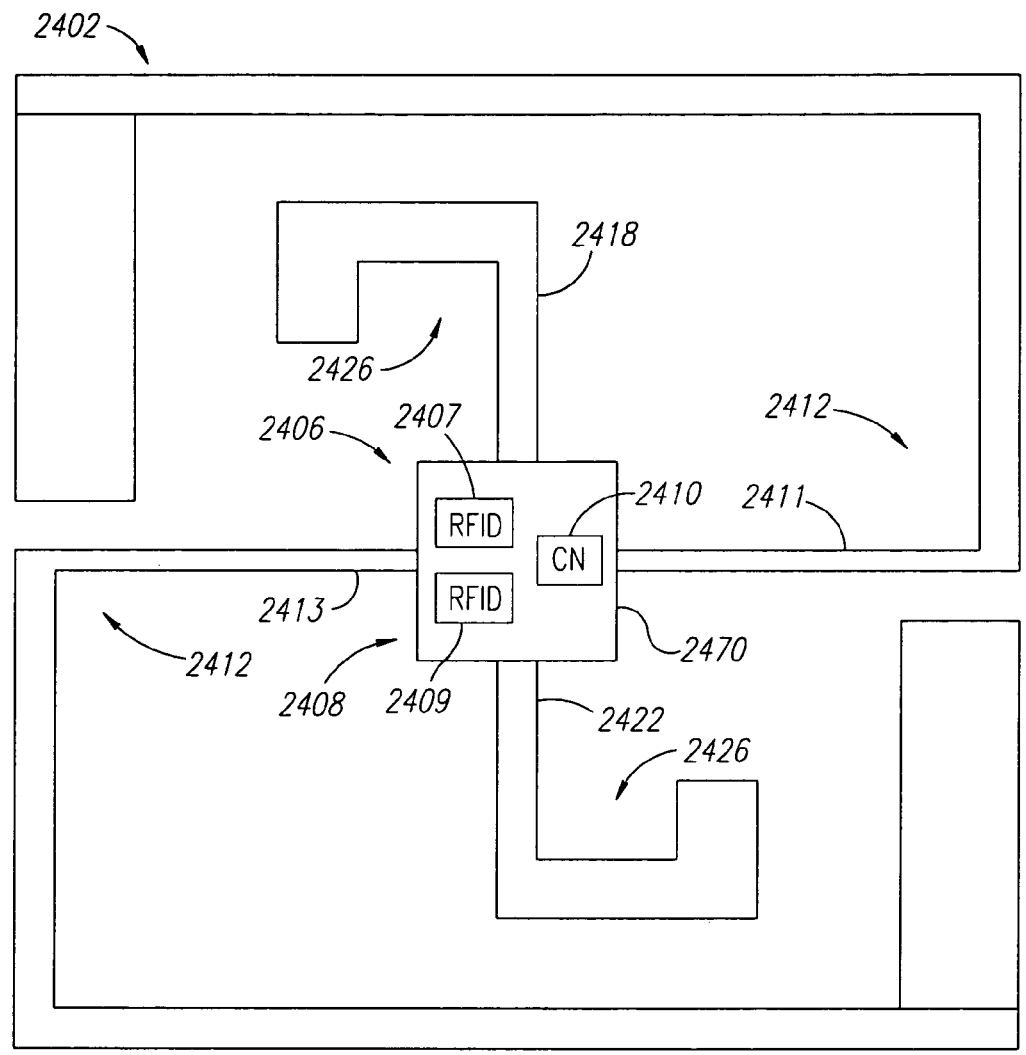
FIG. 24 is a top plan view of an embodiment of an RFID tag.

FIG. 24 is a top plan view of an embodiment of an RFID tag 2402 comprising a first RFID device 2406, a second RFID device 2408 and a controller 2410. The first RFID device 2406 comprises circuitry 2407 (such as the power system 114 and data system 120 of FIG. 1) on an integrated circuit 2470 electrically coupled to an antenna system 2412 comprising a first arm 2411 and a second arm 2413. The second RFID device 2408 comprises circuitry 2409 (such as the power system 128 and data system 134 illustrated in FIG. 1) on the integrated circuit 2470 electrically coupled to an antenna system 2426 comprising a first arm 2418 and a second arm 2422. The first RFID device 2406 and the second RFID device 2408 are communicatively coupled to the controller 2410. The first RFID device 2406 may be configured for operation in a first frequency range or in accordance with a first communications protocol while the second RFID device 2408 is configured for operation in a second frequency range or in accordance with a second communications protocol. The controller 2410 may control one or more of the RFID devices 2406, 2408 based on a state of the RFID tag 2402. The difference in radio-frequency electrical lengths of arm pairs 2411, 2413 and 2418, 2422 facilitates a dual frequency operation of RFID tag 2402.

The RFID tags of the embodiments described above may be readily constructed by printing traces of the portions or of the segments of the antenna systems (see, e.g., antenna system 112 in FIG. 1) on a substrate (see, e.g., substrate 103 in FIG. 1), such as a board, and electrically coupling the antenna systems to other components of the radio-frequency identification devices, such as an integrated circuit (see, e.g., integrated circuit 770 in FIG. 7). The performance characteristics of RFID tags constructed using this method may be readily modified by adjusting the width, lengths, positioning, and, where desired, the curvature of the printed traces used to form the segments of the antenna portions. In addition, parasitic elements of various widths, lengths and curvatures may be positioned around the segments of the antenna system.

Figure 25:
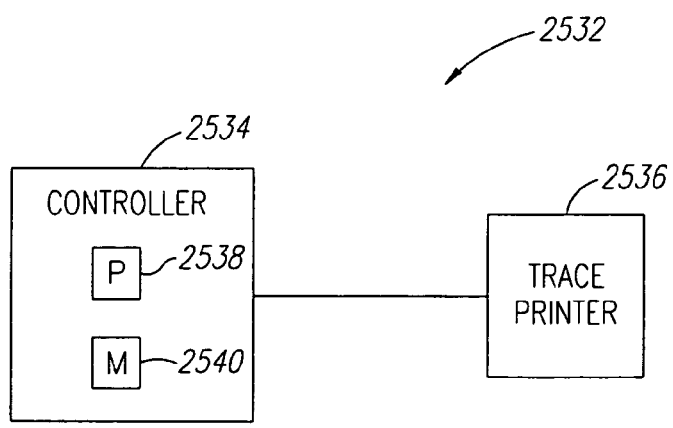
FIG. 25 is a functional block diagram of an embodiment of a trace printer system.

FIG. 25 illustrates a system 2532 comprising a controller 2534 and a trace printer 2536 that may be used to manufacture RFID tags, such as the embodiments described above. The controller 2534 comprises a processor 2538 and a memory 2540 and is configured to control the trace printer 2536. The system 2532 may be readily configured to produce multiple RFID tags in a single manufacturing run. Each RFID tag, and each RFID device on an RFID tag, produced during a run may have the same, or different, performance characteristics. In addition, performance characteristics may be easily modified between manufacturing runs by adjusting the parameters of the printed traces forming the antenna segments.

One particularly advantageous application of embodiments of the RFID tags discussed above is in animal tracking, which uses both ISO 1800-6B in the 915 MHz band and ISO 11784/11785 (the International Standard for Radio Frequency Identification of Animals) in the 134.2 KHz band. A first RFID device could be configured to operate in accordance with ISO 1800-6B in the 915 MHz band and a second RFID device could be configured to operate in accordance with ISO 11784/11785 in the 134.2 KHz band. In addition, it may be possible to locate an animal with a first RFID device (such as RFID device 606 illustrated in FIG. 6) configured to operate at a first frequency, and then decide whether to use a second RFID device (such as RFID device 608 illustrated in FIG. 6 and/or RFID device 664 illustrated in FIG. 6) configured to operate at a different frequency to retrieve data.

The term "computer-readable medium" as used herein refers to any medium that participates in providing instructions to a system or a processor for execution. Such a medium may take many forms, including but not limited to, non-volatile media, volatile media, and transmission media. Non-volatile media includes, for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM and an EEPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

Although specific embodiments of and examples for the RFID tags, devices, methods, and articles are described herein for illustrative purposes, various equivalent modifications can be made without departing from the spirit and scope of this disclosure, as will be recognized by those skilled in the relevant art. The various embodiments described above can be combined to provide further embodiments.

These and other changes can be made to the invention in light of the above-detailed description. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. A radio-frequency identification substrate, the substrate comprising:
   a first radio-frequency identification device;
   a second radio-frequency identification device; and
   a controller communicatively coupled to the first radio-frequency identification device and to the second radio-frequency identification device and configured to control the first radio-frequency identification device based at least in part on whether the second radio-frequency identification device has detected a radio-frequency signal.

2. The radio-frequency identification substrate of claim 1 wherein the controller is further configured to control the second radio-frequency device based at least in part on a state of the first radio-frequency device.

3. The radio-frequency identification substrate of claim 1 wherein the controller is configured to activate the first radio-frequency identification device in response to the detection of the radio-frequency signal by the second radio-frequency identification device.

4. The radio-frequency identification substrate of claim 1 wherein the controller is configured to control at least one of the radio-frequency identification devices based at least in part on a signal indicating a data transmission was not successful.

5. The radio-frequency identification substrate of claim 1 wherein the first radio-frequency identification device is configured to operate in accordance with a first protocol and the second radio-frequency device is configured to operate in accordance with the first protocol.

6. The radio-frequency identification substrate of claim 1 wherein the first radio-frequency identification device comprises:
   a first integrated circuit; and
   a first antenna system electrically coupled to the first integrated circuit.

7. The radio-frequency identification substrate of claim 6 wherein the first integrated circuit comprises:
   a memory; and
   a power source.

8. The radio-frequency identification substrate of claim 6 wherein the first antenna system comprises a parasitic element.

9. The radio-frequency identification substrate of claim 6 wherein the first antenna system comprises a rectilinear portion.

10. The radio-frequency identification substrate of claim 6 wherein the first antenna system comprises a curved portion.

11. The radio-frequency identification substrate of claim 6 wherein the first antenna system comprises:
   a first arm electrically coupled to the first integrated circuit; and
   a second arm electrically coupled to the first integrated circuit.

12. The radio-frequency identification substrate of claim 6 wherein the first antenna system has an inner perimeter and the second radio-frequency identification device is contained within an area defined by the inner perimeter of the first antenna system.

13. The radio-frequency identification substrate of claim 6 wherein the second radio-frequency identification device comprises:
   a second integrated circuit; and
   a second antenna system electrically coupled to the second integrated circuit.

14. The radio-frequency identification substrate of claim 6 wherein the second radio-frequency identification device comprises:
   a second antenna system electrically coupled to the first integrated circuit.

15. The radio-frequency identification substrate of claim 1, wherein the first radio-frequency identification device comprises:
   a first integrated circuit; and
   a first antenna system comprising:
      a first convex portion electrically coupled to the first integrated circuit; and
      a second convex portion electrically coupled to the first integrated circuit.

16. The radio-frequency identification substrate of claim 15 wherein the first convex portion and the second convex portion are configured to form an S-shaped portion of the first antenna system, the first antenna system being electrically coupled to the first integrated circuit between the first and second convex portions.

17. The radio-frequency identification substrate of claim 16 wherein the S-shaped portion is rectilinear.

18. The radio-frequency identification substrate of claim 16 wherein the S-shaped portion comprises a curved portion.

19. The radio-frequency identification substrate of claim 15 wherein the second radio frequency identification device comprises:
   a second antenna system electrically coupled to the first integrated circuit.

20. The radio-frequency identification substrate of claim 19 wherein the second antenna system comprises:
   a third convex portion electrically coupled to the first integrated circuit; and
   a fourth convex portion electrically coupled to the first integrated circuit, wherein the first convex portion and the second convex portion are configured to form a first S-shaped portion of the first antenna system, the first antenna system being electrically coupled to the first integrated circuit along a central portion of the first S-shaped portion, and the third convex portion and the fourth convex portion are configured to form a second S-shaped portion of the second antenna system, the second antenna system being electrically coupled to the first integrated circuit along a central portion of the second S-shaped portion.

21. The radio-frequency identification substrate of claim 1 wherein the first radio-frequency identification device is configured to operate in accordance with a first communication protocol and the second radio-frequency identification device is configured to operate in accordance with a second communication protocol.

22. The radio-frequency identification substrate of claim 1 wherein the first radio-frequency identification device is configured to operate at a first resonant frequency and the second radio-frequency identification device is configured to operate at a second resonant frequency different from the first resonant frequency.

23. The radio-frequency identification substrate of claim 1 wherein the controller is configured to control at least one of the radio-frequency devices based at least in part on a power signal.

24. The radio-frequency identification substrate of claim 1 wherein the controller is configured to control at least one of the radio-frequency devices based at least in part on a signal indicating an amount of data stored in a memory.

25. A radio-frequency identification system, comprising:
   an interrogator operable to produce an interrogation signal; and
   a substrate comprising:
      first means for responding to the interrogation signal;
      second means for responding to the interrogation signal; and
      means for controlling the first means for responding to the interrogation signal based at least in part on whether the second means for responding to the interrogation signal has detected a radio-frequency signal.

26. The radio-frequency identification system of claim 25 wherein the means for controlling is configured to control operation of the second means for responding to the interrogation signal based at least in part on a state of the first means for responding to the interrogation signal.

27. The radio-frequency identification system of claim 25 wherein the first means for responding to the interrogation signal comprises:
   a first integrated circuit; and
   a first antenna system electrically coupled to the first integrated circuit, wherein the first antenna system has an inner perimeter and the second means for responding is contained within an area on the substrate defined by the inner perimeter of the first antenna system.

28. The radio-frequency identification system of claim 25, wherein the first means for responding to the interrogation signal comprises:
   a first integrated circuit; and
   a first antenna system comprising:
      a first convex portion; and
      a second convex portion, wherein the first convex portion and the second convex portion are configured to form an S-shaped portion of the first antenna system, the first antenna system being electrically coupled to the first integrated circuit between the first convex portion and the second convex portion.

29. The radio-frequency identification system of claim 25 wherein the first means for responding to the interrogation signal is configured to operate in accordance with a first communication protocol and the second means for responding to the interrogation signal is configured to operate in accordance with a second communication protocol.

30. The radio-frequency identification system of claim 25 wherein the first means for responding to the interrogation signal is configured to operate at a first resonant frequency and the second means for responding to the interrogation signal is configured to operate at a second resonant frequency different from the first resonant frequency.

31. A method of controlling a first radio-frequency identification device on a substrate, comprising:
  determining, on the substrate, a state of a second radio-frequency identification device on the substrate;
  generating, on the substrate, a control signal based at least in part on the determined state of the second radio-frequency identification device; and
  controlling the first radio-frequency identification device on the substrate based at least in part on the control signal, wherein determining the state of the second radio-frequency identification device comprises determining whether an interrogation signal has been received by the second radio-frequency identification device.

32. The method of claim 31 wherein controlling the first radio-frequency identification device comprises enabling the first radio-frequency identification device in response to receipt of the interrogation signal by the second radio-frequency identification device.

33. The method of claim 32, further comprising:
  disabling the first radio-frequency identification device when a first criteria is satisfied.

34. The method of claim 31, further comprising:
  controlling the second radio-frequency identification device based at least in part on a state of the first radio-frequency identification device.

35. A method of controlling a first radio-frequency identification device on a substrate, comprising:
  determining, on the substrate, a state of a second radio-frequency identification device on the substrate;
  generating, on the substrate, a control signal based at least in part on the determined state of the second radio-frequency identification device;
  controlling the first radio-frequency identification device on the substrate based at least in part on the control signal; and
  controlling the second radio-frequency identification device based at least in part on a state of the first radio-frequency identification device.

36. The method of claim 35, further comprising:
  controlling the first radio-frequency device to operate in accordance with a first protocol; and
  controlling the second radio-frequency device to operate in accordance with the first protocol.

37. The method of claim 35, further comprising:
  controlling the first radio-frequency device to operate in accordance with a first protocol; and
  controlling the second radio-frequency device to operate in accordance with a second protocol different from the first protocol.

38. The method of claim 35, wherein controlling the first radio-frequency identification device comprises enabling the first radio-frequency identification device in response to receipt of an interrogation signal by the second radio-frequency identification device.

39. The method of claim 35 wherein determining a state of the second radio-frequency device comprises determining a state of a memory.

40. A method of controlling a first radio-frequency identification device on a substrate, comprising:
  determining, on the substrate, a state of a second radio-frequency identification device on the substrate, wherein determining the state of the second radio-frequency device comprises determining a state of a memory and at least one of:
    determining a state of a power supply; and
    determining whether an interrogation signal has been detected by the second radio-frequency device;
  generating, on the substrate, a control signal based at least in part on the determined state of the second radio-frequency identification device; and
  controlling the first radio-frequency identification device on the substrate based at least in part on the control signal.

41. The method of claim 40 wherein controlling the first radio-frequency identification device comprises enabling the first radio-frequency identification device in response to receipt of the interrogation signal by the second radio-frequency identification device.

42. The method of claim 41, further comprising:
  disabling the first radio-frequency identification device when a first criteria is satisfied.

43. The method of claim 40, further comprising:
  controlling at least one of the radio-frequency devices based at least in part on a signal indicating a data transmission was not successful.

44. The method of claim 40, further comprising:
  controlling the first radio-frequency device to operate in accordance with a first protocol; and
  controlling the second radio-frequency device to operate in accordance with a second protocol different from the first protocol.

45. A method of controlling a first radio-frequency identification device on a substrate, comprising:
  determining, on the substrate, a state of a second radio-frequency identification device on the substrate, wherein determining the state of the second radio-frequency identification device comprises determining a state of a power supply and determining whether an interrogation signal has been received by the second radio-frequency identification device;
  generating, on the substrate, a control signal based at least in part on the determined state of the second radio-frequency identification device; and
  controlling the first radio-frequency identification device on the substrate based at least in part on the control signal.

46. The method of claim 45 wherein controlling the first radio-frequency identification device comprises enabling the first radio-frequency identification device in response to receipt of the interrogation signal by the second radio-frequency identification device.

47. The method of claim 45, further comprising:
  controlling the second radio-frequency identification device based at least in part on a state of the first radio-frequency identification device.

48. The method of claim 45, further comprising:
  controlling at least one of the radio-frequency devices based at least in part on a signal indicating a data transmission was not successful.

49. The method of claim 45, further comprising:
  controlling the first radio-frequency device to operate in accordance with a first protocol; and
  controlling the second radio-frequency device to operate in accordance with a second protocol.

50. The method of claim 45, further comprising:
  disabling the first radio-frequency identification device when a first criteria is satisfied.

51. The method of claim 45 wherein determining a state of the second radio-frequency identification device comprises determining a state of a memory.

* * * * *